United States Patent
Fukunishi et al.

(10) Patent No.: US 12,438,171 B2
(45) Date of Patent: Oct. 7, 2025

(54) OUTPUT INTEGRATION SYSTEM FOR A PLURALITY OF FUEL CELL ENGINES, AND FUEL CELL VEHICLE EQUIPPED WITH SUCH AN OUTPUT INTEGRATION SYSTEM

(71) Applicant: HONDA MOTOR CO., LTD., Tokyo (JP)

(72) Inventors: Yuki Fukunishi, Tokyo (JP); Shunichi Hirao, Wako (JP); Sohei Takeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 382 days.

(21) Appl. No.: 18/077,432

(22) Filed: Dec. 8, 2022

(65) Prior Publication Data

US 2023/0187672 A1 Jun. 15, 2023

(30) Foreign Application Priority Data

Dec. 9, 2021 (JP) .................. 2021-200061

(51) Int. Cl.
| | |
|---|---|
| *H01M 8/04992* | (2016.01) |
| *B60L 50/71* | (2019.01) |
| *B60L 58/30* | (2019.01) |
| *H01M 8/04082* | (2016.01) |
| *H01M 8/0438* | (2016.01) |
| *H01M 8/04858* | (2016.01) |

(52) U.S. Cl.
CPC ......... *H01M 8/04992* (2013.01); *B60L 50/71* (2019.02); *B60L 58/30* (2019.02); *H01M 8/04201* (2013.01); *H01M 8/0438* (2013.01); *H01M 8/0494* (2013.01); *B60L 2240/12* (2013.01); *H01M 2250/20* (2013.01)

(58) Field of Classification Search
None
See application file for complete search history.

(56) References Cited

U.S. PATENT DOCUMENTS

2014/0352801 A1* 12/2014 McAlister ............ B67D 7/3209
206/459.1

FOREIGN PATENT DOCUMENTS

| JP | 2005302591 A | * | 10/2005 | |
|---|---|---|---|---|
| JP | 2009021218 A | * | 1/2009 | ........ H01M 8/04089 |
| JP | 2012-164495 A | | 8/2012 | |
| JP | 2016-119268 A | | 6/2016 | |
| JP | 2020105926 A | * | 7/2020 | |

OTHER PUBLICATIONS

Office Action dated Aug. 22, 2023 in the corresponding Japanese Patent Application No. 2021-200061 with the English machine translation thereof.

* cited by examiner

*Primary Examiner* — Justin S Lee
(74) *Attorney, Agent, or Firm* — Carrier, Shende & Associates P.C.; Joseph P. Carrier; Jeffrey T. Gedeon

(57) ABSTRACT

A required output (power consumption amount) of each of loads to which electrical power generated by fuel cell stacks is supplied is adjusted, in a manner so that a difference in a residual amount of fuel in the fuel tanks between fuel cell engines is reduced.

5 Claims, 7 Drawing Sheets

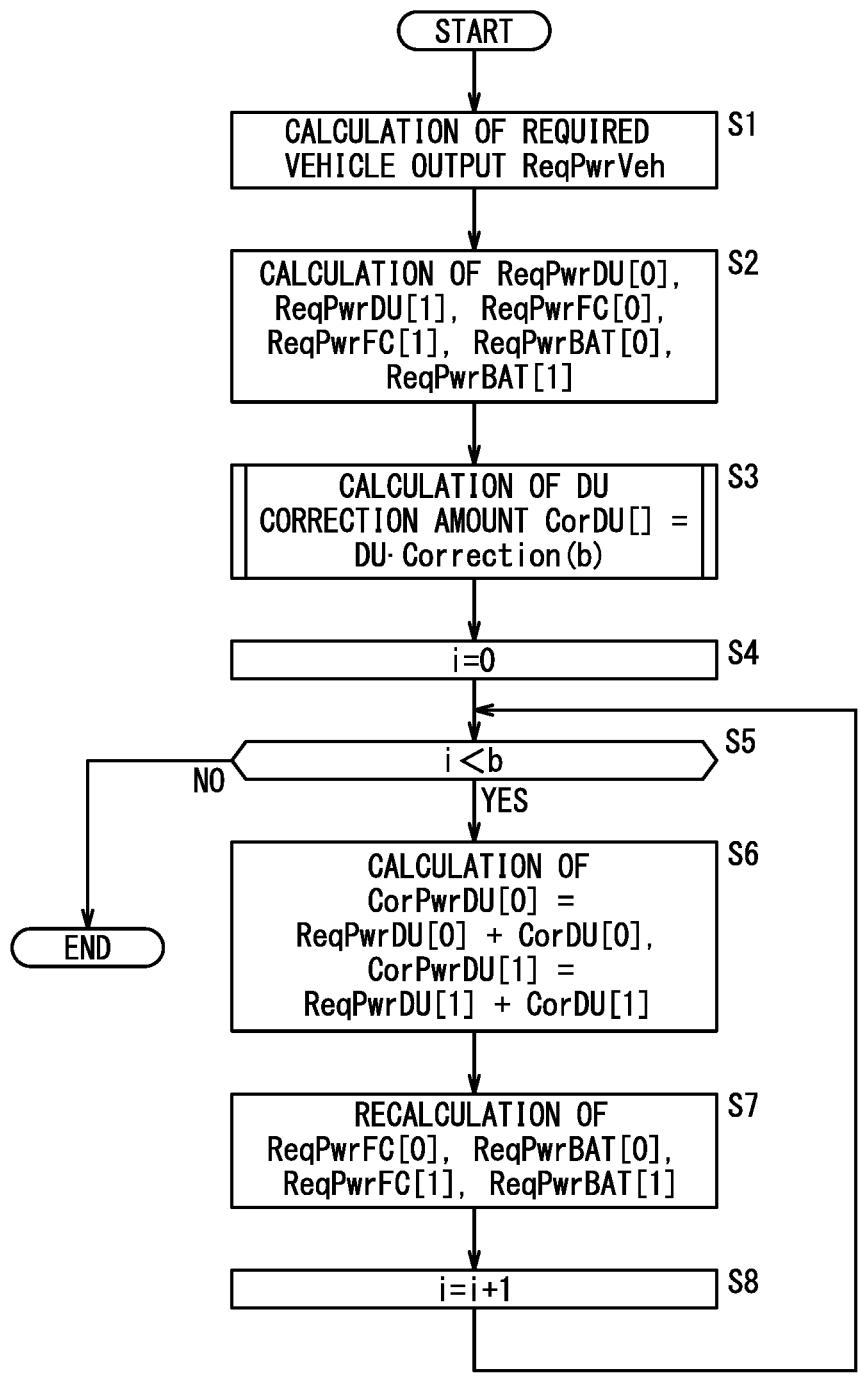

OUTPUT INTEGRATION SYSTEM FOR A PLURALITY OF FUEL CELL ENGINES, AND FUEL CELL VEHICLE EQUIPPED WITH SUCH AN OUTPUT INTEGRATION SYSTEM

CROSS-REFERENCE TO RELATED APPLICATIONS

This application is based upon and claims the benefit of priority from Japanese Patent Application No. 2021-200061 filed on Dec. 9, 2021, the contents of which are incorporated herein by reference.

BACKGROUND OF THE INVENTION

Field of the Invention

The present invention relates to an output integration system for a plurality of fuel cell engines, and to a fuel cell vehicle equipped with such an output integration system.

Description of the Related Art

Recently, a fuel cell vehicle (FCV: Fuel Cell Vehicle) in which hydrogen is used as a fuel has been attracting attention as an automobile in which the environmental impact thereof is less than that of a gasoline vehicle. In such a fuel cell vehicle, air (including oxygen) and hydrogen gas, which serves as a fuel gas, are supplied to a fuel cell. The fuel cell vehicle travels by driving an electric motor using electrical power that is generated by the fuel cell. Therefore, such a fuel cell vehicle is considered to be an environmentally friendly vehicle, because it does not emit carbon dioxide ($CO_2$), NOx, SOx, or the like, but only emits water.

For example, in JP 2016-119268 A, there is disclosed a technology in relation to a high output system (referred to as an output integration system) which can be applied to a large scale vehicle such as a bus or the like, and which is equipped with a plurality of subsystems each having a fuel cell and a fuel tank (referred to as an engine).

In such a technique, in order to equalize the residual pressures of the fuel tanks of the respective engines, a correction is carried out in order to make a required output with respect to a first engine in which the residual output thereof is high to be larger than a required output with respect to a second engine in which the residual output thereof is low.

SUMMARY OF THE INVENTION

Incidentally, in the aforementioned correction, a correction ratio k0 per unit pressure difference is set in advance, and the pressure difference $\Delta P$ is multiplied by the correction ratio k0 to thereby calculate the correction ratio k ($k=k0 \times \Delta P$).

In addition, a required output after correction with respect to the first engine is calculated as "(1+k)×required output before correction", and a required output after correction with respect to the second engine is calculated as "(1−k)×required output before correction" (refer to paragraphs [0002], [0013], [0037], [0038], and [0041] of JP 2016-119268 A).

However, when the correction of the required output with respect to each of the engines is corrected by setting the correction ratio in accordance with a preset correction ratio, it is difficult to adjust the fuel gas consumption accurately in conformity with the operating conditions of an output integration system of high output.

The present invention has the object of solving the aforementioned problem.

An output integration system according to one aspect of the present invention is an output integration system for a plurality of fuel cell engines. The output integration system is configured to integrate outputs from the plurality of fuel cell engines, wherein each of the fuel cell engines includes a fuel cell stack, a fuel tank configured to store a fuel gas supplied to the fuel cell stack, and a load configured to be supplied with electrical power from the fuel cell stack, and to generate a driving force, and the output integration system includes a control device provided at an interior or an exterior of the fuel cell engines, and wherein the control device acquires a difference in a residual amount of fuel in the fuel tanks between the fuel cell engines, and adjusts a required load output, which is an electrical power consumption amount of each of the loads, so as to reduce the difference.

According to the present invention, a required output (electrical power consumption amount) of each of the loads to which the electrical power generated by the fuel cell stacks is supplied is adjusted, in a manner so that a difference in the residual amount of fuel in the fuel tanks between the fuel cell engines becomes minimal.

Therefore, the residual amount of fuel in the fuel tanks of each of the fuel cell engines can be equalized. In accordance with this feature, the operable time period of the output integration system made up of the plurality of fuel cell engines can be lengthened.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 7 is a flow chart provided in order to describe operations of the embodiment shown in FIG. 6.

DESCRIPTION OF THE INVENTION

Embodiment

[Configuration]

Figure 1:
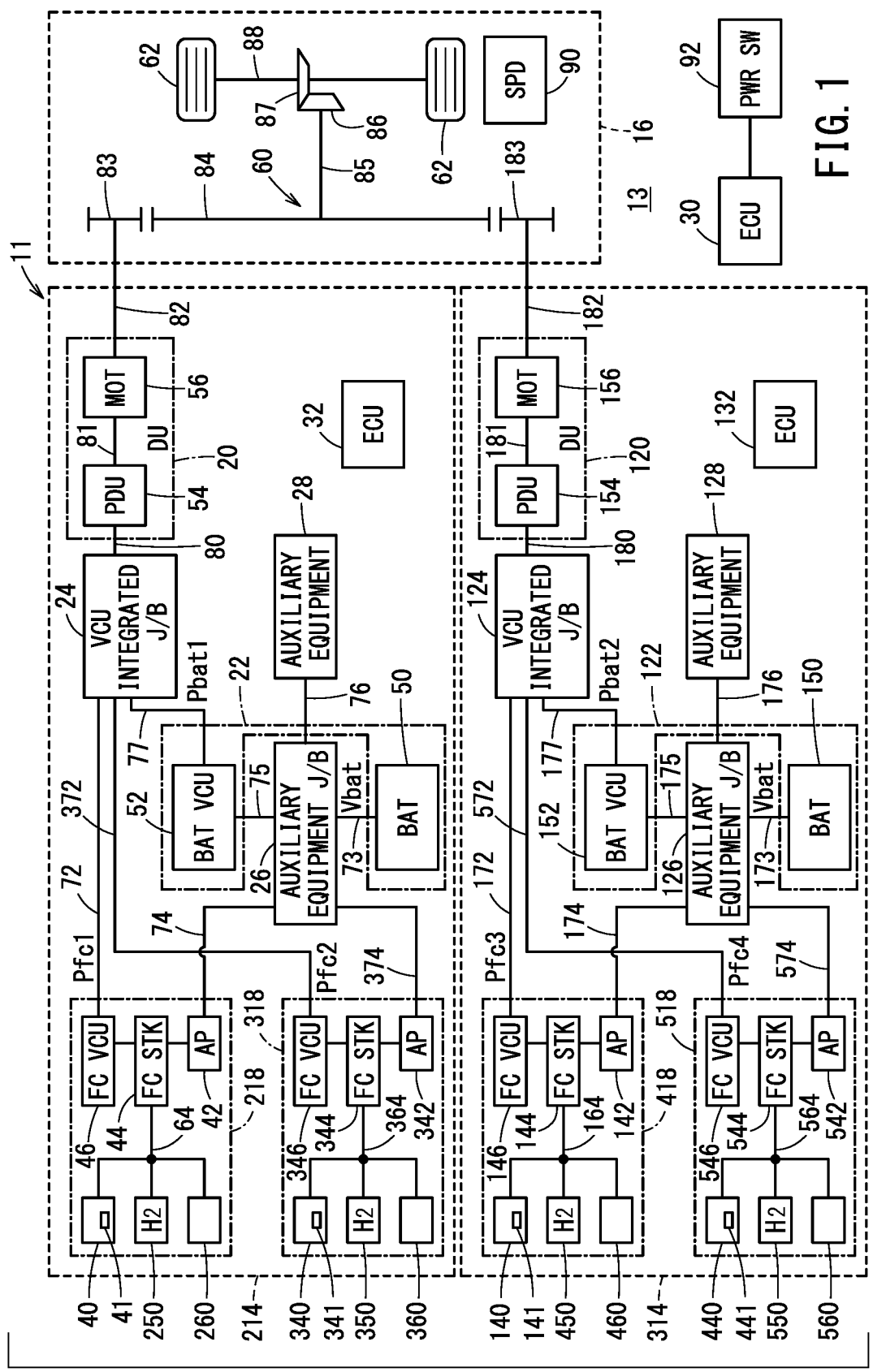
FIG. 1 is a schematic configuration diagram of a fuel cell vehicle according to an embodiment which is equipped with an output integration system for a fuel cell engine according to an embodiment.

FIG. 1 is a schematic configuration diagram of a fuel cell vehicle (referred to as a vehicle) 13 according to an embodiment which is equipped with an output integration system for a fuel cell engine (also simply referred to as an output integration system) 11 according to an embodiment.

As shown in FIG. 1, the fuel cell vehicle 13 is equipped with the output integration system 11, and a propulsion mechanism 16 that travels due to a driving force output from the output integration system 11.

The output integration system 11 includes a plurality, and in the present embodiment, two engines (also referred to as banks, fuel cell engines, or FC engines) 214 and 314. Three or more of such engines may be provided. This output integration system 11 is capable of generating a large driving force that can be applied to large scale vehicles such as trucks and buses or the like.

The one engine 214 is equipped with two FC systems (fuel cell systems) 218 and 318, a BAT system (battery system) 22, a load 20 (also referred to as a drive unit or a DU), an integrated connector (also referred to as a voltage control unit-junction box or a VCU integrated J/B) 24, an auxiliary equipment connector 26 (also referred to as an auxiliary equipment junction box or an auxiliary equipment J/B), auxiliary equipment 28, and a control device (also referred to as an ECU) 32.

The other engine 314 is equipped with two FC systems 418 and 518, a BAT system 122, a load 120, an integrated connector 124, an auxiliary equipment connector 126, auxiliary equipment 128, and a control device 132.

Moreover, it should be noted that the constituent elements of the engine 214 and the engine 314 are the same except for the constituent elements of their auxiliary equipment 28 and 128. In the auxiliary equipment 28 of the engine 214, there are included, for example, an in-vehicle air conditioner and an electric steering device, and in the auxiliary equipment 128 of the engine 314, differing from these features, there are included, for example, a heater for heating and a cargo compartment refrigerator. Accordingly, the electrical power consumption of the auxiliary equipment 28 and the auxiliary equipment 128 usually differ from each other.

Since the constituent elements of the engine 214 and the engine 314 are the same except for their auxiliary equipment 28 and 128, in order to avoid complexity, the one engine 214 will be described in detail below.

Figure 2:
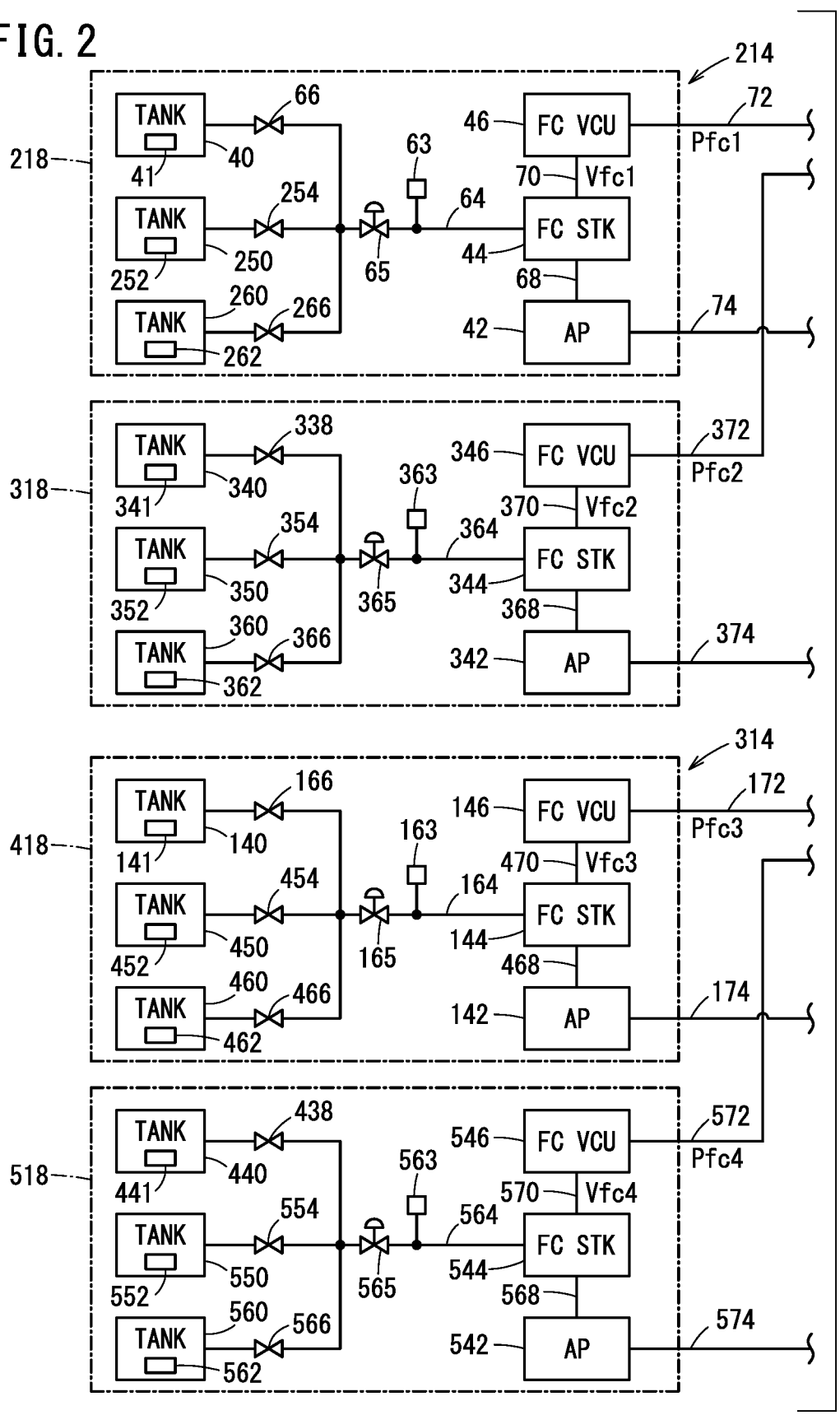
FIG. 2 is a detailed diagram showing, within FIG. 1, an internal configuration of each of respective fuel cell systems.

As shown in FIG. 2, the FC systems 218 and 318 of the engine 214 include, respectively, three fuel tanks 40, 250, and 260 and three fuel tanks 340, 350, and 360.

In order to facilitate convenience of understanding and calculation, the fuel tanks 40, 250, 260, 340, 350, and 360, including all of the fuel tanks (the embodiment and the exemplary modification) described below, are assumed to have the same shape/configuration (same volume) that can be filled with the same fully charged gas energy ($[J]=[Pa] \times [m^3]$).

The three fuel tanks 40, 250, and 260 and the fuel tanks 340, 350, and 360 are equipped respectively with pressure sensors 41, 252, and 262 and pressure sensors 341, 352, and 362 that function as residual amount of fuel sensors.

Passages (pipelines) 64 that communicate between the fuel tanks 40, 250, and 260 and the FC stack 44 of the FC system 218 allow the fuel gas to flow in a branching manner, and valves 66, 254, and 266 are arranged respectively.

A pressure sensor 63 and a pressure reducing valve (pressure reducing valve) 65 are arranged in the passage 64 of the FC system 218 sequentially in order from the side of the FC stack 44. The pressure sensor 63 measures the anode pressure Pa of the FC stack 44. The pressure reducing valve 65 is a regulating valve that maintains the anode pressure Pa of the FC stack 44 at a predetermined pressure which is lower than the pressure in the tanks 40, 250, and 260. The pressure reducing valve 65 may be replaced by an injector.

Similarly, pressure sensors 363, 163, and 563 and pressure reducing valves 365, 165, and 565 are arranged respectively in each of the passages 364, 164, and 564 of the FC systems 318, 418, and 518 sequentially in order from the side of the FC stacks 344, 144, and 544. The pressure sensors 363, 163, and 563 measure the respective anode pressures Pa of the FC stacks 344, 144, and 544. The pressure reducing valves 365, 165, and 565 are regulating valves. The pressure reducing valves 365, 165, and 565 are regulating valves that maintain the respective anode pressures Pa of the FC stacks 344, 144, 544 at a predetermined pressure which is lower than the pressure in the tanks 340 (350, 360), 140 (450, 460), and 440 (550, 560). The pressure reducing valves 365, 165, and 565 may be replaced respectively by injectors.

The FC systems 218, 318, 418, and 518 are each equipped, respectively, with air pumps (AP) 42, 342, 142, and 542 which communicate with the cathode inlet sides of the FC stacks 44, 344, 144, and 544 via passages 68, 368, 468, and 568.

The FC stacks 44, 344, 144, and 544 are equipped with FC converters (fuel cell voltage control units or FC VCUs) 46, 346, 146, and 546, which are voltage boosting converters.

The FC stacks 44 and 344 of the engine 214 are connected respectively to the input ends of the FC converters 46 and 346 through lines 70 and 370, and the output ends of the FC converters 46 and 346 are electrically connected to the integrated connector 24 (see FIG. 1) through lines 72 and 372.

The FC stacks 144 and 544 of the engine 314 are connected respectively to the input ends of the FC converters 146 and 546 through lines 470 and 570, and the output ends of the FC converters 146 and 546 are electrically connected to the integrated connector 124 (see FIG. 1) through lines 172 and 572.

Air pumps 42, 342, 142, and 542 supply an oxygen containing gas, which is compressed air (atmospheric air), to oxygen containing gas inlet passages (not shown) of the FC stacks 44, 344, 144, and 544 through the passages 68, 368, 468, and 568, respectively. The fuel tanks 40 (250, 260), 340 (350, 360), 140 (450, 460), and 440 (550, 560) supply the fuel gas to fuel gas inlet passages (not shown) of the FC stacks 44, 344, 144, 544, respectively, through the pressure reducing valves 65, 365, 165, and 565 and the passages 64, 364, 164, and 564.

The FC stacks 44, 344, 144, and 544 generate respective generated electrical powers Pfc (Pfc1, Pfc2, Pfc3, and Pfc4) by electrochemical reactions taking place between the oxygen containing gas distributed to the cathode flow paths (not shown) through the oxygen containing gas inlet passages (not shown) and the fuel gas distributed to the anode flow paths (not shown) through the fuel gas inlet passages (not shown) (for the sake of convenience, respective reference characters are provided at the output ends of the FC converters 46, 346, 146, and 546).

As shown in FIG. 2, generated voltages Vfc (Vfc1, Vfc2) of the FC stacks 44 and 344 of the engine 214 are boosted in voltage to a higher voltage by the FC converters 46 and 346, respectively, and are supplied as high-voltage generated electrical powers Pfc (Pfc1, Pfc2) to the first and second input terminals of the integrated connector 24 through the lines 72 and 372.

Generated voltages Vfc (Vfc3, Vfc4) of the FC stacks 144 and 544 of the engine 314 are boosted in voltage to a higher voltage by the FC converters 146 and 546, respectively, and are supplied as high-voltage generated electrical powers Pfc (Pfc3, Pfc4) to the first and second input terminals of the integrated connector 124 through the lines 172 and 572.

The FC converters 46, 346, 146, and 546 are voltage boosting converters capable of transmitting electrical power in only one voltage boosting direction from the FC stacks 44, 344, 144, and 544 toward the integrated connectors 24 and 124.

Returning to FIG. 1, the BAT system 22 of the engine 214 is equipped with an electrical power storage device (battery: BAT) 50, and a BAT converter (battery converter, battery voltage control unit: also referred to as a BAT VCU) 52 which is a step-up/step-down converter.

The BAT system 122 of the engine 314 is equipped with an electrical power storage device 150, and a BAT converter 152 which is a step-up/step-down converter.

The auxiliary equipment connector 26 of the engine 214 is connected, respectively, to the electrical power storage device 50 through a line 73, to the air pumps 42 and 342 through lines 74 and 374, to the BAT converter 52 through a line 75, and to the auxiliary equipment 28 through a line 76.

The BAT converter 52 is connected to the integrated connector 24 through a line 77.

The auxiliary equipment connector 126 of the engine 314 is connected, respectively, to the electrical power storage device 150 through a line 173, to the air pumps 142 and 542 through lines 174 and 574, to the BAT converter 152 through a line 175, and to the auxiliary equipment 128 through a line 176.

The BAT converter 152 is connected to the integrated connector 124 through a line 177.

The integrated connector 24 is connected to a DC end of an inverter 54 (also referred to as a power drive unit: PDU) through a line 80, and an AC end of the inverter 54 is connected to a motor 56 through a line 81.

Similarly, the integrated connector 124 is connected to an inverter 154 through a line 180, and the inverter 154 is connected to a motor 156 through a line 181.

In the engine 214, a stored voltage Vbat of the electrical power storage device 50 passes through the auxiliary equipment connector 26 via the line 73, and is supplied to the third input terminal of the integrated connector 24 via the line 77 as a high-voltage stored electrical power Pbat1 that is boosted in voltage through the BAT converter 52.

In the engine 314, a stored voltage Vbat of the electrical power storage device 150 passes through the auxiliary equipment connector 126 via the line 173, and is supplied to the third input terminal of the integrated connector 124 via the line 177 as a high-voltage stored electrical power Pbat2 that is boosted in voltage through the BAT converter 152.

The load 20 of the engine 214 comprises the inverter 54 and the motor (MOT) 56 which is a main machine.

The load 120 of the engine 314 comprises the inverter 154 and the motor 156 which is a main machine.

The generated electrical power Pfc generated by the FC stacks 44 and 344 of the engine 214 is supplied to the load 20 via the FC converters 46 and 346 and the integrated connector 24 at a time when the fuel cell vehicle 13 is traveling. At a time when the fuel cell vehicle 13 (the FC systems 218 and 318) is idling, the generated electrical power Pfc generated by the FC stacks 44 and 344 passes via the integrated connector 24, is converted into electrical power which is stepped down by the BAT converter 52, and charges (stores electricity in) the electrical power storage device 50 through the auxiliary equipment connector 26.

Similarly, the generated electrical power Pfc generated by the FC stacks 144 and 544 of the engine 314 is supplied to the load 120 via the FC converters 146 and 546 and the integrated connector 124 at a time when the fuel cell vehicle 13 is traveling. At a time when the fuel cell vehicle 13 (the FC systems 418 and 518) is idling, the generated electrical power Pfc generated by the FC stacks 144 and 544 passes via the integrated connector 124, is converted into electrical power which is stepped down by the BAT converter 152, and charges (stores electricity in) the electrical power storage device 150 through the auxiliary equipment connector 126.

The inverter 54 (154) converts a single phase DC electrical power into a three phase AC electrical power, and supplies the same to the motor 56 (156) through the line 81 (181).

A rotor (not shown) of the motor 56 (156) is rotated by the three-phase AC electrical power, and a main shaft 82 (182) of the motor 56 (156) connected to this rotor generates a rotational driving force.

The fuel cell vehicle 13 runs through the propulsion mechanism 16 due to a combined rotational driving force of the main shaft 82 of the motor 56 of the engine 214, and the main shaft 182 of the motor 156 of the engine 314.

Furthermore, at a time of decelerating when an accelerator pedal (not shown) of the fuel cell vehicle 13 is released, a regenerative electrical power of the motor 56 of the engine 214, after having been converted into a stepped-down electrical power through the inverter 54, the integrated connector 24, and the BAT converter 52, charges the electrical power storage device 50 through the auxiliary equipment connector 26.

Similarly, at a time of decelerating when an accelerator pedal (not shown) of the fuel cell vehicle 13 is released, a regenerative electrical power of the motor 156 of the engine 314, after having been made into a stepped-down electrical power through the inverter 154, the integrated connector 124, and the BAT converter 152, charges the electrical power storage device 150 through the auxiliary equipment connector 126.

More specifically, the BAT converters 52 and 152 are step-up/step-down converters (bi-directional converters) that are capable of switching between supplying electrical power in a stepped-up direction from the electrical power storage devices 50 and 150 to the loads 20 and 120, and supplying electrical power in a stepped-down direction from the FC systems 218, 318, 418, and 518 and/or the loads 20 and 120 to the electrical power storage devices 50 and 150.

In the engine 214, the air pumps 42 and 342 and the auxiliary equipment 28 are operated using the stored electrical power Pbat of the electrical power storage device 50 as input electrical power. In practice, the air pumps 42 and 342 also operate as auxiliary equipment, and therefore, hereinafter, when the electrical power of the auxiliary equipment 28 is calculated, the electrical power of the air pumps 42 and 342 is also included therein.

Similarly, in the engine 314, the air pumps 142 and 542 and the auxiliary equipment 128 are operated using the stored electrical power Pbat of the electrical power storage device 150 as input electrical power. In this case as well, the air pumps 142 and 542 also operate as auxiliary equipment, and therefore, hereinafter, when the electrical power of the auxiliary equipment 128 is calculated, the electrical power of the air pumps 142 and 542 is also included therein.

The electrical power storage devices 50 and 150 may be secondary batteries such as lithium ion batteries and/or capacitors.

The propulsion mechanism 16, which is connected to the main shaft 82 of the motor 56 of the engine 214 and the main shaft 182 of the motor 156 of the engine 314, is equipped with a speed reducing mechanism 60 and vehicle wheels 62.

The generated electrical power Pfc [W] and the stored electrical power Pbat [W] of each of the engines 214 and 314 are supplied to the loads 20 and 120, either separately or in an integrated (combined) manner through the integrated connectors 24 and 124. The inverters 54 and 154, at a time of so-called powered traveling, convert the DC electrical power into AC electrical power, and supply the same to the motors 56 and 156.

The AC electrical power rotates the motors 56 and 156, and the main shafts 82 and 182 generate the rotational driving force.

Gears 83 and 183 are enmeshed with a gear 84 in the propulsion mechanism 16. The gear 84 is connected to the vehicle wheels 62 via a drive shaft 85, differential gears 86 and 87, and an axle 88.

To explain in greater detail, the rotational driving force of the main shafts 82 and 182 of the motors 56 and 156 cause the vehicle wheels 62 and 62 to rotate through the speed reducing mechanism 60 (the gears 83, 183, and 84), the drive shaft 85, the differential gears 86 and 87, and the axle 88, which collectively constitute the propulsion mechanism 16. In this manner, the fuel cell vehicle 13 travels through the propulsion mechanism 16 due to the rotational driving force of the main shafts 82 and 182 of the motors 56 and 156.

A vehicle speed sensor (SPD) 90 serving as a vehicle speed acquisition unit that measures the vehicle speed VehSpd of the fuel cell vehicle 13 is placed on the drive shaft 85 or the vehicle wheels 62.

The one engine 214 is equipped with a control device 32. The other engine 314 is equipped with the control device 132. The fuel cell vehicle 13 is equipped with a control device 30.

Each of the control devices 30, 32, and 132 is constituted, respectively, by an ECU (Electronic Control Unit). The ECU is a computer including a microcomputer, and includes a CPU (central processing unit) as a processor, a ROM (including an EEPROM) as a memory, a RAM (random access memory), and apart therefrom, input/output devices such as an A/D converter and a D/A converter, and a timer serving as a timekeeping unit. The ECU functions as various function implementing units (function implementing means), for example, such as a control unit, a computation unit, and a processing unit, by one or more CPUs (processors) reading out and executing programs stored in the ROM. These functions can also be realized by hardware.

The control device 32 that controls the engine 214 is connected to each of the respective constituent elements that make up the engine 214 through non-illustrated signal lines and control lines. The control device 32, in addition to the pressure sensors 63, 41, 252, 262, 363, 341, 352, and 362, is connected to various sensors such as non-illustrated pressure sensors, voltage sensors, current sensors, temperature sensors, and rotational speed sensors.

Similarly, the control device 132 that controls the engine 314 is connected to each of the respective constituent elements that make up the engine 314 through non-illustrated signal lines and control lines. The control device 132, in addition to the pressure sensors 163, 141, 452, 462, 563, 441, 552, and 562, is connected to various sensors such as non-illustrated pressure sensors, voltage sensors, current sensors, temperature sensors, and rotational speed sensors.

The control devices 32 and 132 are connected by communication lines (not shown) to the control device (also referred to as a supervisory control device) 30 that controls the output integration system 11 and the fuel cell vehicle 13, and are capable of sharing mutual data and calculation results in real time by way of communication.

The control device 30, in addition to being connected to the vehicle speed sensor 90 and a power switch (PWR SW) 92, which is a power source ON/OFF switch of the fuel cell vehicle 13, is also connected respectively to switch sensors such as a non-illustrated accelerator pedal sensor and a brake pedal sensor, together with being connected to the propulsion mechanism 16 and a non-illustrated electric power steering device or the like.

The control devices 32 and 132 and the control device 30 execute programs stored in a storage device, and control the engines 214 and 314 and the propulsion mechanism 16 with the FC systems 218, 318, 418, and 518, the BAT systems 22 and 122, the auxiliary equipment 28 and 128, the integrated connectors 24 and 124, the auxiliary equipment connectors 26 and 126, and the loads 20 and 120, in accordance with the switched position of the switch, and the physical quantities detected by the sensors.

The control devices 32 and 132 may also be integrated together as one unit in the control device 30.

In order to avoid complexity and to facilitate understanding, in the following description, it is assumed that the output integration system 11 including the engines 214 and 314 and the fuel cell vehicle 13 which is equipped with the propulsion mechanism 16 are controlled by the integrated control device 30.

For example, the control device 30 is capable of setting the generated voltage Vfc (the generated current Ifc, the generated electrical power Pfc) of the FC stacks 44 and 344 by controlling the FC converters 46 and 346 on the basis of the stored voltage Vbat of the electrical power storage device 50.

Further, the control device 30 is capable of setting the generated voltage Vfc (the generated current Ifc, the generated electrical power Pfc) of the FC stacks 144 and 544 by controlling the FC converters 146 and 546 on the basis of the stored voltage Vbat of the electrical power storage device 150.

[Operations]

Next, a description will be given with reference to the flow charts shown in FIGS. 3 to 5 concerning operations of the fuel cell vehicle 13 according to the embodiment, which is equipped with the output integration system 11 according to the embodiment and is constituted basically in the manner described above. A controlling entity is the control device 30, unless otherwise specified.

Moreover, the present control is executed during a state in which the power switch 92 is in the ON position, and the FC system 218 (318, 418, or 518) is generating electrical power. In this case, the fuel cell vehicle 13 is in an operating state during traveling or during idling (referred to as a time of traveling or the like, or a time of operating). During idling, the FC system 218 (318, 418, or 518) is in a state of generating a small amount of electrical power.

At a time when electrical power is being generated such as at a time of traveling or the like, all of the valves 66, 254, 266, 338, 354, 366, 166, 454, 466, 438, 554, and 566 in order to supply the fuel gas from the fuel tanks 40, 250, 260, 340, 350, 360, 140, 450, 460, 440, 550, and 560 to the FC stacks 44, 344, 144, and 544 are opened.

Accordingly, the residual amount of fuel in each of the fuel tanks 40, 250, and 260, which are in communication with the FC stack 44 through the passage 64, will have the same residual amount of fuel. The residual amount of fuel in the FC system 218 can be measured only by the pressure sensor 41.

Similarly, the residual amount of fuel in each of the fuel tanks 340, 350, and 360, which are in communication with the FC stack 344 through the passage 364, will have the same residual amount of fuel. The residual amount of fuel in the FC system 318 can be measured only by the pressure sensor 341.

Further, the residual amount of fuel in each of the fuel tanks 140, 450, and 460, which are in communication with the FC stack 144 through the passage 164, will have the same residual amount of fuel. The residual amount of fuel in the FC system 418 can be measured only by the pressure sensor 141.

Furthermore, the residual amount of fuel in each of the fuel tanks 440, 550, and 560, which are in communication with the FC stack 544 through the passage 564, will have the same residual amount of fuel. The residual amount of fuel in the FC system 518 can be measured only by the pressure sensor 441.

In the engine 214, surplus electrical power generated during traveling and electrical power generated during idling is charged to the electrical power storage device 50 via the FC converters 46 and 346, the integrated connector 24, the BAT converter 52, and the auxiliary equipment connector 26. The stored electrical power Pbat1 in the electrical power storage device 50 is supplied to the air pumps 42 and 342 through the lines 74 and 374 via the auxiliary equipment connector 26, and to the various auxiliary equipment 28 through the line 76.

In the engine 314, surplus electrical power generated during traveling and electrical power generated during idling is charged to the electrical power storage device 150 via the FC converters 146 and 546, the integrated connector 124, the BAT converter 152, and the auxiliary equipment connector 126. The stored electrical power Pbat2 in the electrical power storage device 150 is supplied to the air pumps 142 and 542 through the lines 174 and 574 via the auxiliary equipment connector 126, and to the various auxiliary equipment 128 through the line 176.

Figure 3:
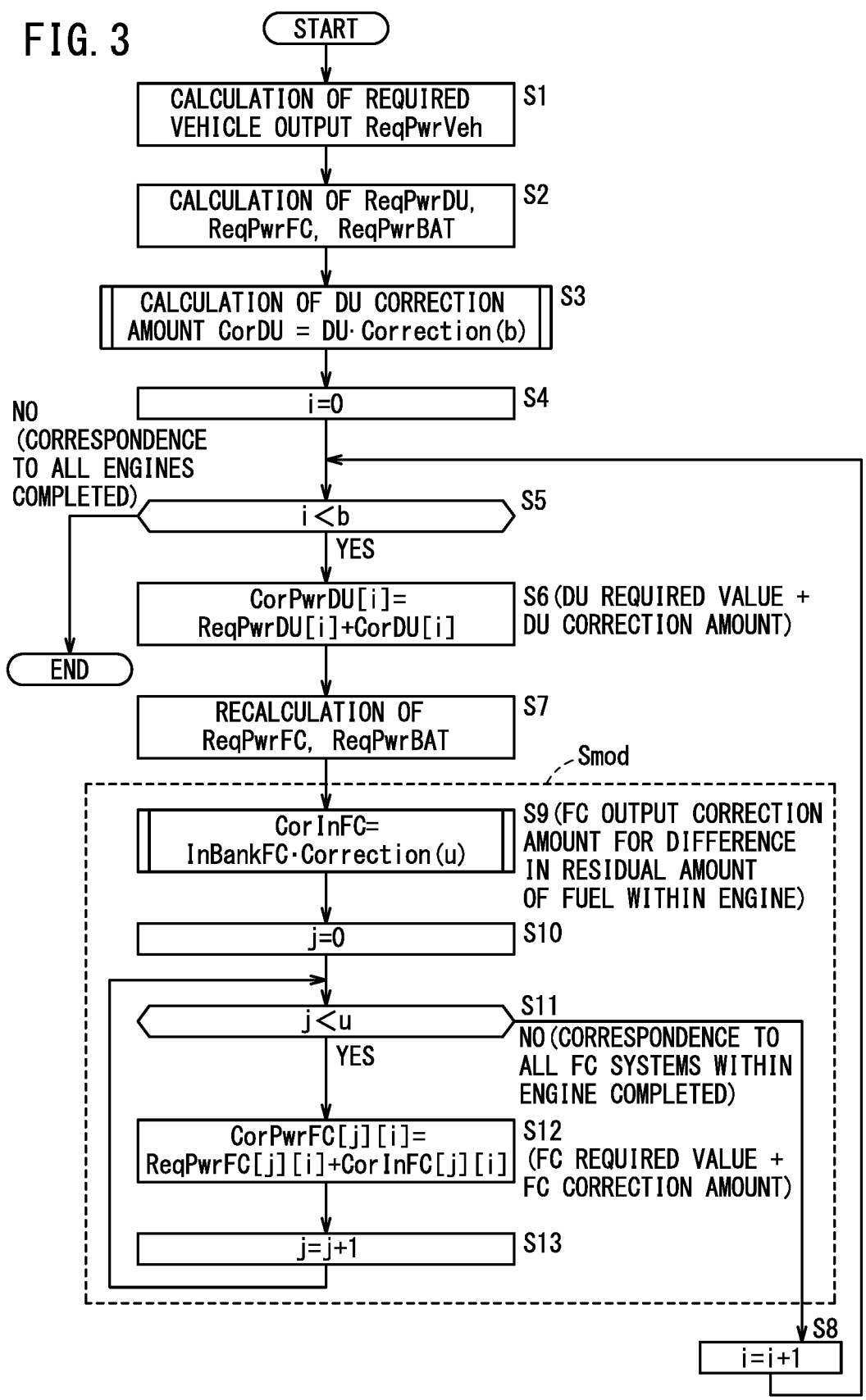
FIG. 3 is a flow chart provided in order to describe operations of the embodiment shown in FIG. 1.

In step S1 of FIG. 3, the control device 30 calculates the required output (required vehicle output, required driving force, required vehicle driving force) ReqPwrVeh [W] of the propulsion mechanism 16 of the fuel cell vehicle 13. The required output ReqPwrVeh of the fuel cell vehicle 13 is calculated based on, for example, the current vehicle speed VehSpd as measured by the vehicle speed sensor 90, a slope of the road, and a target vehicle speed calculated from a degree of opening of the accelerator pedal or the like.

In step S2 of FIG. 3, as shown in formula (1), the required output (load output) ReqPwrDU[0] for the load 20 (where [0] indicates an index indicating a side of the engine 214; hereinafter, such numbering is applied in the same manner), and the required output (load output) ReqPwrDU[1] for the load 120 (where [1] indicates an index indicating a side of the engine 314; hereinafter, such numbering is applied in the same manner) are calculated (allocated) in a manner so that the required output ReqPwrVeh [W] of the fuel cell vehicle 13 is covered by a combined output (total output) of the engines 214 and 314.

$$\text{ReqPwrVeh}=\text{ReqPwrDU}[0]+\text{ReqPwrDU}[1] \quad (1)$$

At the same time, in step S2 of FIG. 3, as shown in formula (2), the generated electrical output (required generated output, FC output) ReqPwrFC[0][0] of the FC system 218 (the [0] on the left side indicates the FC system 218, and the [0] on the right side indicates the engine 214. Hereinafter, the indexes [i][i] will be applied in a similar manner), the generated electrical output ReqPwrFC[1][0] of the FC system 318 (the [1] on the left side indicates the FC system 318, and the [0] on the right side indicates the engine 214. Hereinafter, the indexes [i][i] will be applied in a similar manner), and the required electrical power storage output ReqPwrBAT[0] of the BAT system 22 are calculated in order to cover the required output ReqPwrDU[0] [W] for the load 20 of the engine 214.

$$\text{ReqPwrDU}[0]=\text{ReqPwrFC}[0][0]+\text{ReqPwrFC}[1][0]+\text{ReqPwrBAT}[0] \quad (2)$$

At the same time, in step S2 of FIG. 3, as shown in formula (3), the generated electrical output ReqPwrFC[0][1] of the FC system 418, the generated electrical output ReqPwrFC[1][1] of the FC system 518, and the electrical power storage output ReqPwrBAT[1] of the BAT system 122 are calculated in order to cover the required output ReqPwrDU[1] [W] ([1] indicates the engine 314) for the load 120 of the engine 314.

$$\text{ReqPwrDU}[1]=\text{ReqPwrFC}[0][1]+\text{ReqPwrFC}[1][1]+\text{ReqPwrBAT}[1] \quad (3)$$

Next, in step S3 of FIG. 3, with respect to the required outputs ReqPwrDU[0] and ReqPwrDU[1] of the loads 20 and 120, a determination is made as to whether or not a correction process (DU correction process) to reduce a difference in a total residual amount of fuel between the engines 214 and 314, which will be described next, is necessary. For this purpose, the load correction amount (also referred to as a DU correction amount) CorDU [W]=DU·Correction(b) is calculated. In this instance, the "b" in DU·Correction(b) is the number of the engines of the output integration system 11, which in the present embodiment, is two, namely the engines 214 and 314, and therefore, "b"=2.

Moreover, the DU correction process between the engines 214 and 314 is a process that is carried out in order to eliminate or reduce (equalize) a difference between the total residual amount of fuel in the fuel tanks (40, 250, 260, 340, 350, and 360) of the engine 214 and the total residual amount of fuel in the fuel tanks (140, 450, 460, 440, 550, and 560) of the engine 314 during generation of electrical power by the FC systems 218, 318, 418, and 518 of the fuel cell vehicle 13, by correcting (adjusting) a distributed amount of the output electrical power for the loads 20 (120).

The DU correction process between the engines 214 and 314 will now be described in slightly more detail. Within both of the engines 214 and 314, in order to quickly reduce the total residual amount of fuel in the fuel tanks of one of the engines in which the total residual amount of fuel remaining therein is large, there is a process of relatively increasing the load (DU) output ReqPwrDU of the one engine in which the total residual amount of fuel remaining therein is large, while on the other hand, in order to delay the reduction in the total residual amount of fuel in the fuel tanks of the other engine in which the total residual amount of fuel is small, there is a process of relatively reducing the load (DU) output ReqPwrDU of the other engine in which the total residual amount of fuel is small.

Thus, by controlling (processing) the load (DU) output ReqPwrDU[0] of the engine 214 and the load (DU) output ReqPwrDU[1] of the engine 314 in a complementary (offsetting) manner, a difference between the residual amount of fuel in the fuel tanks {for example, the total residual amount of fuel in the fuel tanks (40, 250, 260, 340, 350, and 360)} of the one engine and the residual amount of fuel in the fuel tanks {hence, the total residual amount of fuel in the fuel tanks (140, 450, 460, 440, 550, and 560)} of the other engine can be reduced over time while the combined output of the output integration system 11 (the required output ReqPwrVeh) remains unchanged (while being maintained at a constant value).

At the same time, according to the present embodiment, the following processing is carried out by the process of step S9 (see FIG. 5), the details of which will be described later. More specifically, within the one engine (within the engine 214 or within the engine 314), a process is carried out to rapidly reduce the total residual amount of fuel in the three fuel tanks (in this case, the fuel tanks 40, 250, and 260) by relatively increasing the generated electrical power of the one fuel cell system (within the engine 214 will be taken as an example, for example, the fuel cell system 218) in which the total residual amount of fuel of the three fuel tanks is higher. On the other hand, in order to delay the reduction in the total fuel of the three fuel tanks (the fuel tanks 340, 350, and 360) of the other fuel cell system (in this case, the fuel cell system 318 within the engine 214) in which the total residual amount of fuel is small, a process is carried out to relatively reduce the generated electrical power of the other fuel cell system 318.

By carrying out such a process, according to the present embodiment, the difference between the total residual amount of fuel in the fuel tanks of the one engine and the total residual amount of fuel in the fuel tanks of the other engine can be reduced over time, while at the same time, the difference in the residual amount of fuel of the fuel tanks between the fuel cell systems within the same engine can be reduced over time.

Figure 4:
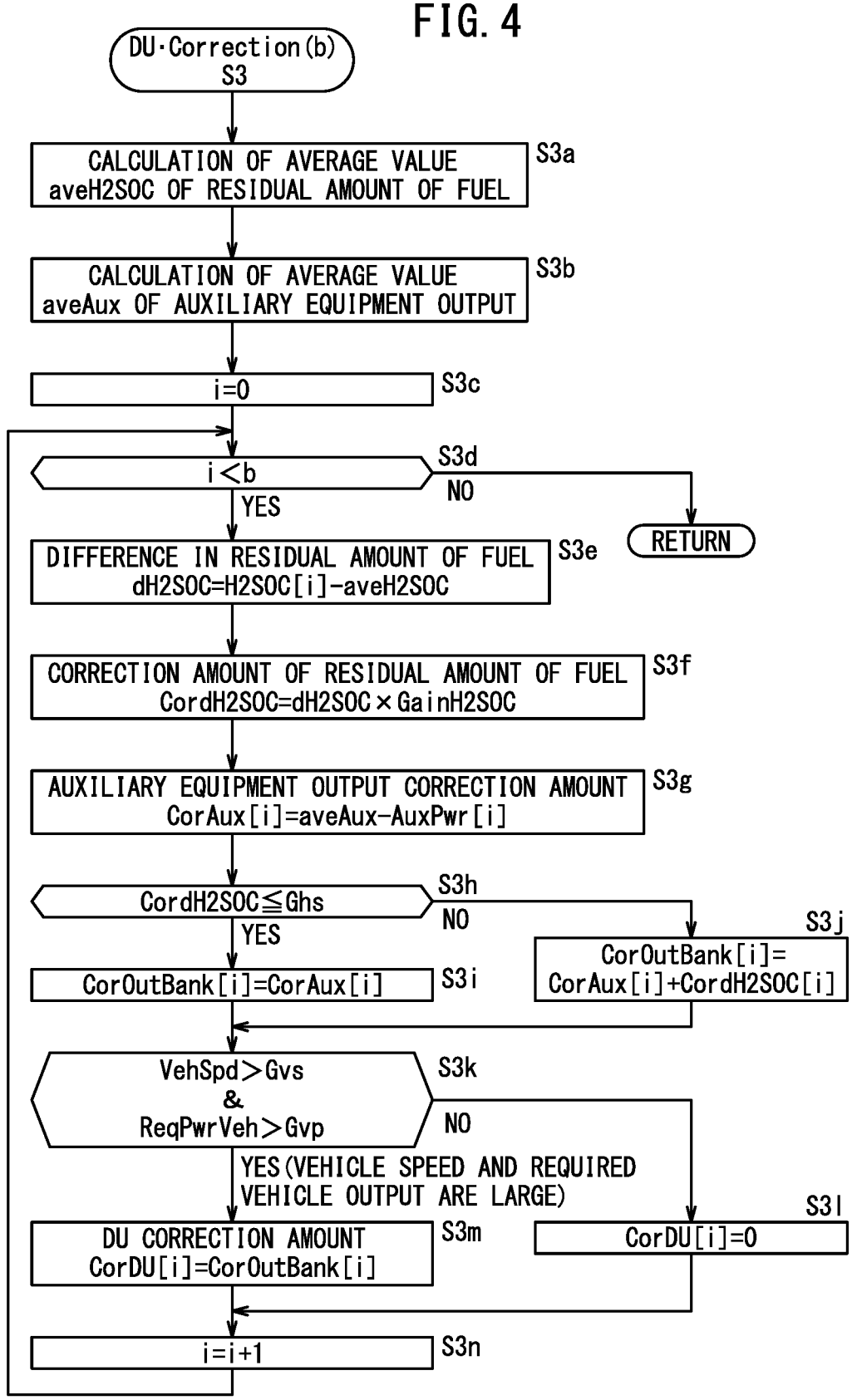
FIG. 4 is a flow chart showing details of a load correction amount calculation process in order to reduce or eliminate a difference in a residual amount of fuel between the engines in step S3 of FIG. 3.

FIG. 4 is a detailed flow chart provided in relation to a process of calculating the load correction amount CorDU=DU·Correction(b) (where b indicates the number of the engines) in order to correct (adjust) the output electrical power of the load (DU) 20 (120), in order to reduce the difference in the residual amount of fuel between the engines 214 and 314 in step S3 of FIG. 3.

In step S3a of FIG. 4, an average value aveH2SOC [Pa] of the residual amount of fuel in the fuel tanks (40, 250, 260, 340, 350, and 360) of the engine 214 and the fuel tanks (140, 450, 460, 440, 550, and 560) of the engine 314 is calculated.

Moreover, although a unit of the residual amount of fuel is a unit of energy [J]=[Pa]×[m$^3$], since the volume [m$^3$] of all of the fuel tanks is the same, a description will be given in which a unit of pressure [Pa] will be used instead (the same applies hereinafter).

Thus, the residual amount of fuel of the fuel tanks 40, 250, and 260 that are in communication is acquired from the pressure that is measured by the pressure sensor 41. Similarly, the residual amount of fuel of the fuel tanks 340, 350, and 360 that are in communication is acquired from the pressure that is measured by the pressure sensor 341. Similarly, the residual amount of fuel of the fuel tanks 140, 450, and 460 that are in communication is acquired from the pressure that is measured by the pressure sensor 141. Similarly, the residual amount of fuel of the fuel tanks 440, 550, and 560 that are in communication is acquired from the pressure that is measured by the pressure sensor 441.

As shown in formula (4), the average value aveH2SOC [Pa] of the residual amount of fuel is calculated as an average value of the total residual amount of fuel H2SOC[0] in the fuel tanks 40, 250, 260, 340, 350, and 360 of the engine 214, and the total residual amount of fuel H2SOC[1] in the fuel tanks 140, 450, 460, 440, 550, and 560 of the engine 314.

$$aveH2SOC = (H2SOC[0] + H2SOC[1])/2 \quad (4)$$

In step S3b, from the detected values of the non-illustrated voltage sensors and the current sensors, the output AuxPwr[0] of the auxiliary equipment 28 of the engine 214, and the output AuxPwr[1] of the auxiliary equipment 128 of the engine 314 are acquired, and as shown in formula (5), the average value aveAux [W] of the auxiliary equipment output, which is an average value, is calculated.

$$aveAux = (AuxPwr[0] + AuxPwr[1])/2 \quad (5)$$

In this instance, as well as in the flow chart, the indexes of the engines 214 and 314 are taken to be i (i=0, 1), and the number of the engines of the engines 214 and 314 is taken to be b (b=2).

In step S3c, the index i is set to i=0 (initially, the engine 214).

In step S3d, a determination is made as to whether or not the index i is less than the number of engines b (i<b).

In the first instance of this determination, since (0<2), step S3d is affirmative (step S3d: YES), and the process proceeds to step S3e.

In step S3e, the difference in the residual amount of fuel dH2SOC [Pa] of the engine 214 whose index i is i=0 is calculated by formula (6).

$$dH2SOC = H2SOC[i] - aveH2SOC \quad (6)$$
$$= H2SOC[0] - aveH2SOC$$

Stated otherwise, the difference in the residual amount of fuel dH2SOC of the engine 214 is calculated as a value obtained by subtracting the average value aveH2SOC of the residual amount of fuel in all of the fuel tanks 40, 250, 260, 340, 350, 360, 140, 450, 460, 440, 550, and 560 of the engines 214 and 314 (step S3a, formula (4)) from the total residual amount of fuel H2SOC[0] in the fuel tanks 40, 250, 260, 340, 350, and 360 of the engine 214 specified by the index i (i=0).

Next, in step S3f, a correction amount CordH2SOC [W] of the residual amount of fuel (adjustment amount of the residual amount of fuel) in order to correct (adjust) the difference in the residual amount of fuel dH2SOC [Pa] of the engine 214 calculated in step S3e by the load 20 of the engine 214 is calculated (converted) by formula (7).

$$CordH2SOC = dH2SOC \times GainH2SOC \quad (7)$$

In this instance, the GainH2SOC [W/Pa] is a corrective gain (conversion factor), and is a ratio ($\Delta DU/\Delta H2$) between a unit fuel increment $\Delta H2$ [Pa] of the fuel gas in the anode flow path inside the FC stack 44 (344), which is supplied from the fuel tanks 40, 250, and 260 (340, 350, and 360) through the pressure reducing valve 65 (365), and a unit output increment $\Delta DU$ [W] for the load 20. Such a ratio ($\Delta DU/\Delta H2$) is measured in advance as a characteristic (map) of an incremental function, and is recorded as a map in the storage device of the control device 30 (32). Even if the ratios are of different values between the fuel cell system 218 and the fuel cell system 318, it is possible to carry out a reduction or elimination control of the difference in the residual amount of fuel.

Next, in step S3g, an auxiliary equipment output correction amount CorAux[i]=CorAux[0] [W] of the auxiliary equipment 28 is calculated by formula (8) as a difference in the auxiliary equipment output of the engine 214.

$$CorAux[0] = aveAux - AuxPwr[i] \quad (8)$$
$$= aveAux - AuxPwr[0]$$

Stated otherwise, the auxiliary equipment output correction amount CorAux of the engine 214 is calculated as a value obtained by subtracting the output AuxPwr[0] of the auxiliary equipment 28 of the engine 214 specified by the index i (i=0) from the average value aveAux of the auxiliary equipment output, which is the average value of the auxiliary equipment output AuxPwr[0] of the auxiliary equipment 28 of the engine 214 (including the input electrical power of the air pumps 42 and 342), and the auxiliary equipment output AuxPwr[1] of the auxiliary equipment 128 of the engine 314 (including the input electrical power of the air pumps 142 and 542).

Next, in step S3h, by means of the inequality (9), a determination is made as to whether or not the correction amount CordH2SOC[0] of the residual amount of fuel of the engine 214 is less than or equal to a predetermined threshold value Ghs [Pa].

$$CordH2SOC[0] \leq Ghs \quad (9)$$

In the case of being less than or equal to the threshold value Ghs (step S3h: YES), it is assumed that the correction amount CordH2SOC[0] of the residual amount of fuel is small, and the difference in the residual amount of fuel is small.

In this case, in step S3i, the correction amount CorOutBank[i]=CorOutBank[0] [W] of the engine 214 is set to only the auxiliary equipment output correction amount CorAux[0] with respect to the auxiliary equipment 28, as shown in formula (10).

$$CorOutBank[0] = CorAux[0] \quad (10)$$

On the other hand, in the case of being greater than the threshold value Ghs (step S3h: NO), then in step S3j, the engine correction amount CorOutBank[0] [W] of the engine 214 is set, as shown in formula (11), to a value obtained by adding the auxiliary equipment output correction amount CorAux[0] with respect to the auxiliary equipment 28 calculated in step S3g, and the correction amount CordH2SOC[0] of the residual amount of fuel calculated in step S3f.

$$CorOutBank[0] = CorAux[0] + CordH2SOC[0] \quad (11)$$

More specifically, in the case that the correction amount CordH2SOC of the residual amount of fuel exceeds the threshold value Ghs (step S3h: NO), the engine correction amount CorOutBank[0] of the engine 214 is set to a total correction amount of the auxiliary equipment output correction amount CorAux[0] and the correction amount CordH2SOC[0] of the residual amount of fuel.

Next, in step S3k, as shown in formula (12), a determination is made as to whether or not the vehicle speed VehSpd [m/s] acquired from the vehicle speed sensor 90 is of a value in excess of a threshold value Gvs [m/s] which is a set value, and a required output (required driving force) ReqPwrVeh [W] (step S1) of the vehicle 13 is of a value in excess of a threshold value Gvp [W].

$$VehSpd > Gvs \ \& \ ReqPwrVeh > Gvp \quad (12)$$

In this case, in the case that at least one of the conditions of the left side or the right side of the "&" in formula (12) is not satisfied (step S3k: NO), then in step S3l, as shown in formula (13), the load correction amount CorDU[i]=CorDU[0] of the engine 214 is set to 0, and the correction (adjustment) is not implemented.

$$CorDU[0] = 0 \quad (13)$$

This is because, in a state in which the fuel cell vehicle 13 is stopped, such as during idling, or alternatively, when traveling at a low speed [m/s] less than or equal to the threshold value Gvs [m/s], since the generated electrical power Pfc generated by the FC system 218 (the FC stack 44) is small, even with such a correction (adjustment), it is difficult to obtain in a short time period an effect of the correction (adjustment), or stated otherwise, an effect of reducing the residual amount of fuel (an effect of reducing a difference in the residual amount of fuel) in the fuel tanks 40, 250, 260, 340, 350, and 360.

On the other hand, under a condition of "step S3k: YES" (VehSpd>Gvs & ReqPwrVeh>Gvp), then in step S3m, as shown in formula (14), the load correction amount CorDU[0] in order to implement the adjustment (correction) of the required load output, which is the electrical power consumption amount for the load 20 of the engine 214, is calculated.

$$CorDU[i] = CorDU[0] \quad (14)$$
$$= CorOutBank[0]$$

In the first instance of step S3m, the correction (adjustment) corresponding to the correction amount CorOutBank[0] set in step S3i or step S3j is placed in a state that is capable of being implemented with respect to the load 20 of the engine 214 designated by the index i=0.

In actuality, at this time, substantially simultaneously therewith, the correction (adjustment) corresponding to the correction amount CorOutBank[1], which will be described next, is placed in a state that is capable of being implemented with respect to the load 120 of the other engine 314.

More specifically, in step S3n, while incrementing the index i by 1, in a manner so that i=i+1=1 (the engine 314), execution of the process is carried out from step S3d: YES (1<2)→step S3e→step S3f {correction amount CordH2SOC[1] of the residual amount of fuel}→step S3g {auxiliary equipment output correction amount CorAux [1]=aveAux−AuxPwr[1]}→step S3h→(step S3i or step S3j)→step S3k→(step S3l or step S3m)→step S3n (i=2)→step S3d (where i=2 and b=2, i<b?): NO.

Accordingly, in the second instance of step S3m, the correction (adjustment) corresponding to the correction amount CorOutBank set in step S3i or step S3j is placed in a state that the correction is capable of being implemented with respect to the load 120 of the engine 314 designated by the index i=1, whereupon the process proceeds to step S4 of FIG. 3.

In this case, for example, in the second instance of step S3*m*, the load correction amount CorDU[1] in order to implement the adjustment (correction) of the required load output, which is the electrical power consumption amount for the load 120, is calculated as shown in formula (15).

$$CorDU[i] = CorDU[1] \\ = 1 \qquad (15)$$

Next, in step S4 of FIG. 3, the index i is set to i=0 (the engine 214).

In step S5, a determination is made as to whether or not the index i is less than the number of engines b (i<b).

In the first determination of step S5, since the inequality i<b (0<2) is satisfied, then after S5: YES, and after completion of the later-described step S6, step S7, and step Smod, the steps are carried out from step S8 (i=i+1=1: engine 314), step S5: YES, step S6, step S7, step Smod, step S8 (i=i+1=2), step S5 (where i=2 and b=2, i<b?): NO, whereupon the process comes to an end.

Thus, in the process of the first instance of step S6, the corrected engine output required value CorPwrDU[0] for the load 20 of the engine 214 is calculated by formula (16), and in the process of the second instance of step S6, the corrected engine output required value CorPwrDU[1] for the load 120 of the engine 314 is calculated by formula (17).

$$CorPwrDU[0]=ReqPwrDU[0]+CorDU[0] \qquad (16)$$

$$CorPwrDU[1]=ReqPwrDU[1]+CorDU[1] \qquad (17)$$

Formula (16) is a formula for calculating the corrected engine output required value CorPwrDU[0] that is set for the load 20 of the one engine 214, in order to correct (adjust) the difference in the total residual amount of fuel in the fuel tanks 40, 250, 260, 340, 350, and 360 of the engine 214 and the total residual amount of fuel in the fuel tanks 140, 450, 460, 440, 550, and 560 of the engine 314. The corrected engine output required value CorPwrDU[0] that is set for the load 20 is a value obtained by adding the DU correction amount CorDU[0] calculated in step S3*m* or step S3*j* to the required output ReqPwrDU[0] for the load 20 calculated in step S2.

Formula (17) is a formula for calculating the corrected engine output required value CorPwrDU[1] that is set for the load 120 of the other engine 314, in order to correct (adjust) the difference in the total residual amount of fuel in the fuel tanks 40, 250, 260, 340, 350, and 360 of the engine 214 and the total residual amount of fuel in the fuel tanks 140, 450, 460, 440, 550, and 560 of the engine 314. The corrected engine output required value CorPwrDU[1] that is set for the load 120 of the other engine 314 is a value obtained by adding the DU correction amount CorDU[1] calculated in step S3*m* or step S3*j* to the required output ReqPwrDU[1] for the load 120 calculated in step S2.

In this case, it should be noted that the auxiliary equipment output correction amount CorAux[0] for the auxiliary equipment 28 which is calculated in the first instance of step S3*g*, and the auxiliary equipment output correction amount CorAux[1] for the auxiliary equipment 128 which is calculated in the second instance of step S3*g* in the flowchart in FIG. 4, respectively, are values obtained by subtracting the auxiliary equipment output AuxPwr[0] for the auxiliary equipment 28 or the auxiliary equipment output AuxPwr[1] for the auxiliary equipment 128 from the auxiliary equipment output average value aveAux, and therefore, the positive and negative signs thereof are reversed while the values thereof are equal.

Further, it should be noted that the correction amount CordH2SOC[0] of the residual amount of fuel for the engine 214 which is calculated in the first instance of step S3*f*, and the correction amount CordH2SOC[1] of the residual amount of fuel for the engine 314 which is calculated in the second instance of step S3*f* in the flow chart of FIG. 4 are values obtained by multiplying the corrective gain GainH2SOC (a positive value) by a value obtained by having subtracted the total residual amount of fuel H2SOC[0] of the fuel tanks 40, 250, 260, 340, 350, and 360 or the total residual amount of fuel H2SOC[1] of the fuel tanks 140, 450, 460, 440, 550, and 560 from the average value aveH2SOC of the residual amount of fuel (step S3*e*, step S3*f*), and therefore, the positive and negative signs thereof are reversed while the values thereof are equal.

More specifically, the DU correction amount CorDU[0] that is set for the load 20 of the engine 214, and the DU correction amount CorDU[1] that is set for the load 120 of the engine 314 in formulas (16) and (17) have opposite signs and are equal in value.

Therefore, in the case that the corrected engine output required value CorPwrDu[0] for the load 20 of the engine 214, and the corrected engine output required value CorPwrDu[1] for the load 120 of the engine 314 as shown in formula (16) and formula (17) are set, and the load required output, which is the electrical power consumption amount for the load 20 and the load 120 is adjusted (corrected), the required output (required driving force) ReqPwrVeh [W] for the propulsion mechanism 16 of the fuel cell vehicle 13 remains unchanged.

Stated otherwise, without changing the driving force of the fuel cell vehicle 13, a correction (adjustment) can be carried out to reduce or eliminate the difference in the residual amount of fuel and/or the difference in the auxiliary equipment output.

Next, in the first instance of step S7, the generated output ReqPwrFC[0][0] (the [0] on the left side is an index identifying the FC system 218, and the [0] on the right side is an index identifying the engine 214) of the FC system 218, the generated output ReqPwrFC[1][0] (the [1] on the left side is an index identifying the FC system 318, and the [0] on the right side is an index identifying the engine 214) of the FC system 318, and the electrical power storage output (battery output) ReqPwrBAT[0] of the BAT system 22 are recalculated, in order to cover the corrected engine output required value CorPwrDU[0] for the load 20 of the engine 214 in the first instance of step S6.

Similarly, in the second instance of step S7, the generated output ReqPwrFC[0][1] (the [0] on the left side is an index identifying the FC system 418, and the [1] on the right side is an index identifying the engine 314), the generated output ReqPwrFC[1][1] (the [1] on the left side is an index identifying the FC system 518, and the [1] on the right side is an index identifying the engine 314) of the FC systems 418 and 518, and the electrical power storage output (battery output) ReqPwrBAT[1] of the BAT system 122 are recalculated, in order to cover the corrected engine output required value CorPwrDU[1] for the load 120 of the engine 314 in the second instance of step S6.

In actuality, after step S5: NO, the control device 30 sets and controls the load output of the load 20 of the engine 214 on the basis of the corrected amount in the first instance of step S6, and controls the FC systems 218 and 318 and the BAT system 22 in accordance with the load output of the load 20 due to the recalculated values in the first instance of step S7. Simultaneously therewith, the control device 30 sets and controls the load output of the load 120 of the engine 314 on the basis of the corrected amount in the second instance of step S6, and controls the FC systems 418 and 518 and the BAT system 122 in accordance with the load output of the load 120 due to the recalculated values in the second instance of step S7.

Next, a description will be given concerning the process of step Smod in order to eliminate a difference {(a difference in the total residual amount of fuel in the fuel tanks 40, 250, and 260 and the total residual amount of fuel in the fuel tanks 340, 350 and 360) and (a difference in the total residual amount of fuel in the fuel tanks 140, 450, and 460 and the total residual amount of fuel in the fuel tanks 440, 550 and 560)} in the residual amount of fuel in the FC systems 218 and 318 (418 and 518) within the engine 214 (314).

In the first instance of step S9 in FIG. 3, an FC output correction amount InBankFC-Correction[u] (u is the number of the FC systems 218 and 318 within the engine 214, wherein in this instance, u=2) is calculated on the basis of the difference (the difference between the total residual amount of fuel in the fuel tanks 40, 250, and 260 and the total residual amount of fuel in the fuel tanks 340, 350, and 360) in the residual amount of fuel in the one engine 214.

Figure 5:
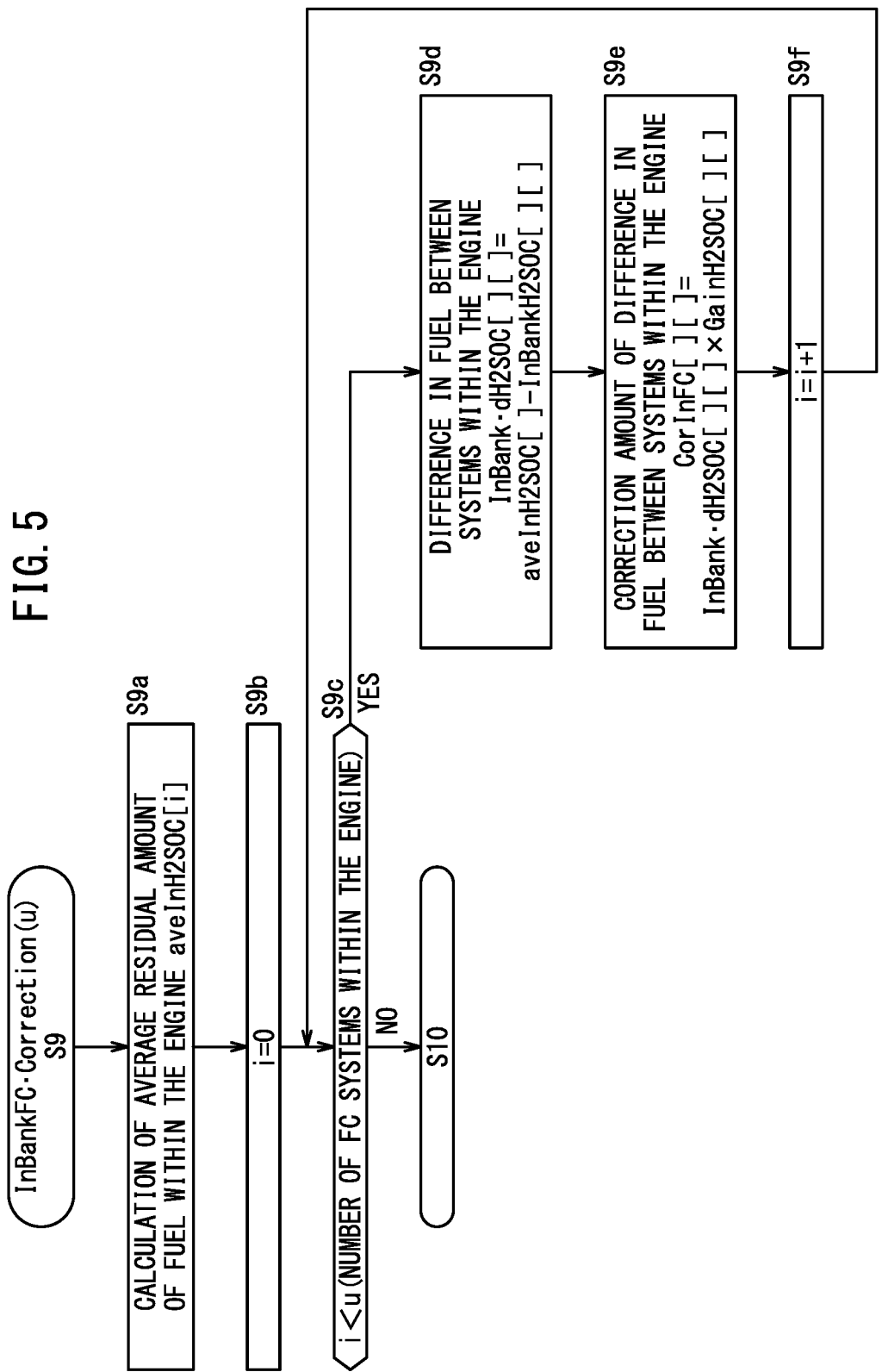
FIG. 5 is a flow chart showing details of a process of calculating a fuel cell output correction amount in order to reduce or eliminate a difference in the residual amount of fuel within the engine in step S9 of FIG. 3.

FIG. 5 is a detailed flow chart provided in relation to a process of calculating the FC output correction amount InBankFC·Correction(u) in step S9 of FIG. 3.

In the first instance of step S9a, an average residual amount of fuel within the engine aveInH2SOC[0] concerning the one engine 214 is calculated.

In this case, within the engine 214, it is considered that the valves 66, 254, and 266 (FIG. 2) are opened to thereby equalize the respective pressures of the fuel tanks 40, 250, and 260 that are in communication with each other, and further, the valves 338, 354, and 366 are opened to thereby equalize the respective pressures of the fuel tanks 340, 350, and 360 that are in communication with each other.

As shown in formula (18), the average residual amount of fuel within the engine aveInH2SOC[0] [Pa] of the one engine 214 is calculated as the average value of the residual amount of fuel InBankH2SOC[0][0] [Pa] in the fuel tanks 40, 250, and 260 detected by the pressure sensor 41, and the residual amount of fuel InBankH2SOC[1][0] [Pa] in the fuel tanks 340, 350, and 360 detected by the pressure sensor 341.

$$aveInH2SOC[0]=(InBankH2SOC[0][0]+InBankH2SOC[1][0])/2 \quad (18)$$

Next, in step S9b, the index i is set to i=0 (the FC system 218 and the FC system 318 within the engine 214).

In the first instance of step S9c, a determination is made as to whether or not the index i is less than the number u of the FC systems within the engine (i<u) (where u is the number of the FC systems, u=2).

Since the first instance of the determination in step S9c is affirmative (step S9c: YES), the process proceeds to step S9d.

In the first instance of step S9d, the difference in the fuel between the systems within the engine InBank·dH2SOC[0][0] is calculated by formula (19). The difference InBank·dH2SOC[0][0] is a value that is obtained by subtracting the residual amount of fuel InBankH2SOC[0][0] of the FC system 218 (the fuel tanks 40, 250, and 260) within the one engine 214, from the average residual amount of fuel within the engine aveInH2SOC[0] ([engine index]) [Pa] of the engine 214.

$$InBank·dH2SOC[0][0]([FC\ system\ index][engine\ index])=aveInH2SOC[0]-InBankH2SOC[0][0] \quad (19)$$

In step S9e, the FC output correction amount within the engine CorInFC[0][0] (units: [W]), which is a correction amount (adjustment amount) of the FC system 218 that covers (fills) the difference in the fuel between the systems within the engine InBank·dH2SOC[0][0], is calculated by formula (20).

$$CorInFC[0][0]=InBank·dH2SOC[0][0]\times GainH2SOC[0][0] \quad (20)$$

In this instance, the GainH2SOC[0][0] [W/Pa] is a corrective gain (conversion factor), and is a ratio (ΔPfc/ΔH2) between a unit fuel increment ΔH2 [Pa] of the fuel gas within the FC stack 44, which is supplied from the fuel tanks 40, 250, and 260 through the pressure reducing valve 65, and a unit electrical power generation increment ΔPfc [W] of the FC stack 44. Such a corrective gain is obtained as a characteristic (map) of an incremental function that is measured beforehand, and is stored as a map in the storage device of the control device (30) 32.

Next, in step S9f, the value of i is incremented by i=i+1=0+1, and the determination of step S9c is carried out. In this case, since it is the second instance, and i<u is true (1<2), the processes of step S9d and step S9e are performed again.

In the second instance of step S9d, the difference in the fuel between the systems within the engine InBank·dH2SOC[1][0] is calculated by formula (21). The difference InBank·dH2SOC[1][0] is a value that is obtained by subtracting the residual amount of fuel InBankH2SOC[1][0] of the FC system 318 (the fuel tanks 340, 350, and 360) within the one engine 214, from the average residual amount of fuel within the engine aveInH2SOC[0] of the engine 214.

$$InBank·dH2SOC[1][0]=aveInH2SOC[0]-InBankH2SOC[1][0] \quad (21)$$

In the second instance of step S9e, the FC output correction amount within the engine CorInFC[1][0] (units: [W]), which is a correction amount (adjustment amount) of the FC system 318 that covers (fills) the difference in the fuel between the systems within the engine InBank·dH2SOC[1][0], is calculated by formula (22).

$$CorInFC[1][0]=InBank·dH2SOC[1][0]\times GainH2SOC[1][0] \quad (22)$$

In this instance, the GainH2SOC[1][0] [W/Pa] is a corrective gain (conversion factor), and is a ratio (ΔPfc/ΔH2) between a unit fuel increment ΔH2 [Pa] of the fuel gas within the FC stack 344, which is supplied from the fuel tanks 340, 350, and 360 through the pressure reducing valve 365, and a unit electrical power generation increment ΔPfc [W] of the FC stack 344. Such a corrective gain is obtained as a characteristic (map) of an incremental function that is measured beforehand, and is stored as a map in the storage device of the control device 30 (32).

Next, in the second instance of step S9f, the value of i is incremented by i=i+1, and the determination of the third instance of step S9c is carried out. In the third instance of the determination, since i<u is negative (i=2, u=2), the process is brought to an end, and then the process proceeds to step S10 of FIG. 3.

Thereafter, in step S10, the index j in order to specify the FC system within the one engine 214 is set to the index j=0.

Next, the process is carried out from the first instance of step S11 (0<2): YES, the first instance of step S12, the first instance of step S13 (j=j+1=1), the second instance of step S11 (1<2): YES, the second instance of step S12, the second instance of step S13 (j=j+1=2), until the third instance of step S11 (j<u?, where j=2 and u=2): NO.

In this case, in the process of the first instance of step S12, the corrected FC output required value CorPwrFC[0][0] that is set in the FC system 218 is calculated by formula (23), and in the process of the second instance of step S12, the corrected FC output required value CorPwrFC[1][0] that is set in the FC system 318 is calculated by formula (24).

$$CorPwrFC[0][0]=ReqPwrFC[0][0]+CorInFC[0][0] \qquad (23)$$

$$CorPwrFC[1][0]=ReqPwrFC[1][0]+CorInFC[1][0] \qquad (24)$$

In this instance, the FC output correction amount within the engine CorInFC[0][0] and the FC output correction amount within the engine CorInFC[1][0] have the same magnitude and are of opposite signs.

In this case, since the correction in the residual amount of fuel between the FC systems 218 and 318 within the engine of the engine 214 is carried out by the generated electrical power Pfc generated by the FC system 218, and the generated electrical power Pfc generated by the FC system 318, the electrical power supplied to the load 20 through the lines 72 and 372, the integrated connector 24, and the line 80 does not change. More specifically, even though the correction process of the residual amount of fuel (the process of decreasing or eliminating the difference) between the FC system 218 and the FC system 318 is carried out, the input to the load 20 (the output of the load 20) does not change.

Next, in the first instance of step S8, the value of i is incremented by i=i+1, the second instance of step S5: YES, and in the second instance of step S6, the corrected engine output required value CorPwrDU[1] concerning the other engine 314, as described previously, is calculated by formula (17).

Next, in the second instance of step S7, the required output ReqPwrFC[0][1] of the FC system 418, the required output ReqPwrFC[1][1] of the FC system 518, and the electrical power storage output (battery output) ReqPwrBAT[1] of the BAT system 122 are recalculated in order to cover the corrected engine output required value CorPwrDU[1] of the load 120 of the engine 314 in the second instance of step S6.

Although the control device 30 controls the FC systems 418 and 518 and the BAT system 122 by means of the recalculated values, at the same time, the process of the second instance of step Smod is carried out.

In the process of the second instance of step Smod, as discussed previously, there is included the processing content of reducing or eliminating the difference between the total residual amount of fuel in the tanks 140, 450, and 460 that supply the fuel gas to the FC stack 144 of the FC system 418 within the other engine 314, and the total residual amount of fuel in the tanks 440, 550, and 560 that supply the fuel gas to the FC stack 544 of the FC system 518.

In this case, in the process of the second instance of step S9a, as shown in formula (25) which corresponds to formula (18), the average residual amount of fuel within the engine aveInH2SOC[1] [Pa] of the other engine 314 is calculated as the average value of the residual amount of fuel InBankH2SOC[0][1][Pa] in the fuel tanks 140, 450, and 460 detected by the pressure sensor 141, and the residual amount of fuel InBankH2SOC[1][1] [Pa] in the fuel tanks 440, 550, and 560 detected by the pressure sensor 441.

$$aveInH2SOC[1]=(InBankH2SOC[0][1]+ \\ InBankH2SOC[1][1])/2 \qquad (25)$$

Next, in the second instance of step S9b, the index i is set to i=0 (the FC system 418 and the FC system 518 within the engine 314).

In the second instance of step S9c, a determination is made as to whether or not the index i is less than the number u of the FC systems within the engine (i<u) (where u is the number of the FC systems, u=2).

Since the first instance of the determination in the second instance of step S9c is affirmative (step S9c: YES), the process proceeds to the third instance of step S9d.

In the third instance of step S9d, the difference in the fuel between the systems within the engine InBank·dH2SOC[0][1] is calculated by formula (26) which corresponds to formula (19). The difference InBank·dH2SOC[0][1] is a value that is obtained by subtracting the residual amount of fuel InBankH2SOC[0][1] of the FC system 418 (the fuel tanks 140, 450, and 460) within the other engine 314, from the average residual amount of fuel within the engine aveInH2SOC[1] ([engine index]) [Pa] of the engine 314.

$$InBank \cdot dH2SOC[0][1]([FC \text{ system index}][engine \\ index])=aveInH2SOC[1]-InBankH2SOC[0][1] \qquad (26)$$

In the third instance of step S9e, the FC output correction amount within the engine CorInFC[0] [1] (units: [W]), which is a correction amount (adjustment amount) of the FC system 418 that covers (fills) the difference in the fuel between the systems within the engine InBank·dH2SOC[0][1], is calculated by formula (27) which corresponds to formula (20).

$$CorInFC[0][1]=InBank \cdot dH2SOC[0][1] \times GainH2SOC \\ [0][1] \qquad (27)$$

In this instance, the GainH2SOC[0][1] [W/Pa] is a corrective gain (conversion factor), and is a ratio (ΔPfc/ΔH2) between a unit fuel increment ΔH2 [Pa] of the fuel gas within the FC stack 144, which is supplied from the fuel tanks 140, 450, and 460 through the pressure reducing valve 165, and a unit electrical power generation increment ΔPfc [W] of the FC stack 144. Such a corrective gain is obtained as a characteristic (map) of an incremental function that is measured beforehand, and is stored as a map in the storage device of the control device 30 (32).

Next, in step S9f, the value of i is incremented by i=i+1, and the determination of step S9c is carried out. In this case, since it is the third instance, and i<u is 1<2 (step S9c: YES), the processes of the fourth instance of step S9d and the fourth instance of step S9e are performed again.

In the fourth instance of step S9d, the difference in the fuel between the systems within the engine InBank·dH2SOC[1][1] is calculated by formula (28). The difference InBank·dH2SOC[1][1] is a value that is obtained by subtracting the residual amount of fuel InBankH2SOC[1][1] of the FC system 518 (the fuel tanks 440, 550, and 560) within the other engine 314 from the average residual amount of fuel within the engine aveInH2SOC[1] of the engine 314.

$$InBank \cdot dH2SOC[1][1]=aveInH2SOC[1]- \\ InBankH2SOC[1][1] \qquad (28)$$

In the fourth instance of step S9e, the FC output correction amount within the engine CorInFC[1][1] (units: [W]), which is a correction amount (adjustment amount) of the FC system 518 that covers (fills) the difference in the fuel between the systems within the engine InBank·dH2SOC[1][1], is calculated by formula (29).

$$CorInFC[1][1]=InBank \cdot dH2SOC[1][1] \times GainH2SOC \\ [1][1] \qquad (29)$$

In this instance, the GainH2SOC[1][1] [W/Pa] is a corrective gain (conversion factor), and is a ratio (ΔPfc/ΔH2) between a unit fuel increment ΔH2 [Pa] of the fuel gas within the FC stack 544, which is supplied from the fuel tanks 440, 550, and 560 through the pressure reducing valve 565, and a unit electrical power generation increment ΔPfc [W] of the FC stack 544. Such a corrective gain is obtained as a characteristic (map) of an incremental function that is measured beforehand, and is stored as a map in the storage device of the control device 30 (32).

Next, in the fourth instance of step S9f, the value of i is incremented by i=i+1, and the determination of the fourth instance of step S9c is carried out. In the fourth instance of the determination, since i<u is negative (i=2, u=2; step S9c: NO), the process is brought to an end, and then the process proceeds to step S10 of FIG. 3.

Thereafter, in the second instance of step S10, the index j in order to specify the FC system within the other engine 314 is set to the index j=0.

Next, the process is carried out from step S11: YES, step S12, step S13, step S11: YES, step S12, step S13, until step S11: NO.

In this case, in the process of the third instance of step S12, the corrected FC output required value CorPwrFC[0][1] that is set in the FC system 418 is calculated by formula (30), and in the process of the fourth instance of step S12, the corrected FC output required value CorPwrFC[1][1] that is set in the FC system 518 is calculated by formula (31).

$$CorPwrFC[0][1]=ReqPwrFC[0][1]+CorInFC[0][1] \quad (30)$$

$$CorPwrFC[1][1]=ReqPwrFC[1][1]+CorInFC[1][1] \quad (31)$$

In this instance, the FC output correction amount within the engine CorInFC[0][1] and the FC output correction amount within the engine CorInFC[1][1] have the same magnitude and are of opposite signs.

In this case, since the correction in the residual amount of fuel between the FC systems 418 and 518 within the engine 314 is carried out by the generated electrical power Pfc generated by the FC system 418, and the generated electrical power Pfc generated by the FC system 518, the electrical power supplied to the load 120 through the lines 172 and 572, the integrated connector 124, and the line 180 does not change. More specifically, even though the correction process of the residual amount of fuel (the process of decreasing or eliminating the difference) between the FC system 418 and the FC system 518 is carried out, the output of the load 120 also does not change.

Next, in the second instance of step S8, the value of i is incremented by i=i+1=2, and in the third instance of step S5: NO, the setting process is brought to an end.

In actuality, after step S5: NO, the control device 30 sets and controls the load output of the load 20 on the basis of the corrected amount in step S6, and controls the FC system 18 and the BAT system 22 in accordance with the load output of the load 20 due to the recalculated values in step S7. Simultaneously therewith, the control device 30 sets and controls the load output of the load 120 on the basis of the corrected amount in step S6, and sets and controls the FC system 118 and the BAT system 122 in accordance with the load output of the load 120 due to the recalculated values in step S7.

SUMMARY OF THE EMBODIMENT

A. Equalization of Residual Amount of Fuel Between the Engine 214 and the Engine 314

During generation of electrical power (during the electrical power generating operation, which includes traveling and idling), in a manner so that the difference in the total residual amount of fuel H2SOC[0] in the fuel tanks 40, 250, 260, 340, 350, and 360 of the fuel cell engine 214 and the total residual amount of fuel H2SOC[1] in the fuel tanks 140, 450, 460, 440, 550, and 560 of the fuel cell engine 314 (the residual amount of fuel H2SOC[0] of the engine 214—the residual amount of fuel H2SOC[1] of the engine 314) becomes small, the required output (electrical power consumption) ReqPwrDU[0] for the load 20 to which the generated electrical power Pfc of the FC stacks 44 and 344 of the fuel cell engine 214 is supplied, and the required output (electrical power consumption) ReqPwrDU[1] for the load 120 to which the generated electrical power Pfc of the FC stacks 144 and 544 of the fuel cell engine 314 is supplied are adjusted.

For example, the results when the average value aveH2SOC of the residual amount of fuel is subtracted from the residual amount of fuel (H2SOC[0] or H2SOC[1]) are compared. If the difference is the larger (and becomes a positive value) for the residual amount of fuel H2SOC[0] (the total residual amount of fuel in the fuel tanks 40, 250, 260, 340, 350, and 360) of the engine 214, the required output of the load 20 which is covered by such a residual amount of fuel H2SOC[0] is set to the larger of the required outputs (ReqPwrDU[0]+CorDU[0] (a positive value)), and the required output of the load 120 which is covered by such a residual amount of fuel H2SOC[1] having the smaller of the differences (a negative value) is set to the smaller of the required outputs (ReqPwrDU[1]+CorDU[1] (a negative value)) (step S6).

In this manner, the DU correction amount [0]=CorDU[0] for the load 20 is controlled so as to become a positive value, and the DU correction amount [1]=CorDU[1] for the load 120 is controlled so as to become a negative value in which the absolute value thereof is the same.

In this case, an increase in the DU correction amount CorDU[0] for the load 20 is obtained by recalculating an FC output request value RecPwrFC[0] for the FC systems 218 and 318, and setting the value thereof to a large value. Due to this setting, the pressure reducing valves 65 and 365 are adjusted by the ECU 32 (or the ECU 30) in a manner so that the amount of hydrogen supplied to the FC stack 344 becomes larger. On the other hand, a decrease in the DU correction amount CorDU[1] for the load 120 is obtained by recalculating an FC output request value RecPwrFC[0] for the FC systems 418 and 518, and setting the value thereof to a small value. Due to this setting, the pressure reducing valves 165 and 565 are adjusted by the ECU 132 (or the ECU 30) in a manner so that the amount of hydrogen supplied to the FC stacks 144 and 544 becomes smaller (step S7).

Thus, the difference in the residual amount of fuel in the fuel tanks 40 and 140 can be decreased or eliminated over time, without changing the total value of the required outputs of the loads 20 and 120 (ReqPwrDU[0]+ReqPwrDU[1]) that cover the required vehicle output ReqPwrVeh.

Therefore, the total residual amount of fuel in the fuel tanks 40, 250, 260, 340, 350, and 360 of the FC engine 214, and the residual amount of fuel in the fuel tanks 140, 450, 460, 440, 550, and 560 of the FC engine 314 can be equalized.

In accordance with this feature, the operable time period of the output integration system 11 made up of the plurality of FC engines 214 and 314 can be lengthened. Accordingly, the operable time period of the fuel cell vehicle 13 can be lengthened.

Moreover, when the residual amount of fuel between the FC engine 214 and the FC engine 314 is equalized, since the residual amount of fuel (the total residual amount of fuel in the fuel tanks 40, 250, and 260) of the FC system 218 and the residual amount of fuel (in the tanks 340, 350, and 360) of the FC system 318 within the FC engine 214 are made equal, it is possible to lengthen the operable time period by the total electrical power of the generated electrical power Pfc1 of the FC system 218 and the generated electrical power Pfc2 of the FC system 318.

Similarly, when the residual amount of fuel between the FC engine 214 and the FC engine 314 is equalized, since the residual amount of fuel (the total residual amount of fuel in the fuel tanks 140, 450, and 460) of the FC system 418 and the residual amount of fuel (in the tanks 440, 550, and 560) of the FC system 518 within the FC engine 314 are made equal, it is possible to lengthen the operable time period by the total electrical power of the generated electrical power Pfc3 of the FC system 418 and the generated electrical power Pfc4 of the FC system 518.

B. Control to Maintain the Stored Electrical Power (SOC of the Electrical Power Storage Devices 50 and 150)

In the above-described embodiment, simultaneously with performing the process of decreasing the difference in the residual amount of fuel over time, the differences aveAux−AuxPwr[0] and aveAux−AuxPwr[1] obtained by subtracting the auxiliary equipment outputs AuxPwr[0] and AuxPwr[1] of the auxiliary equipment 28 and 128 from the average value aveAux of the auxiliary equipment output (step S3g) are added as auxiliary equipment output correction amounts CorAux[0] and CorAux[1](having positive and negative values in which the absolute values thereof are the same) to the correction amount CordH2SOC[i] of the residual amount of fuel (step S3j).

For example, in the case that the auxiliary equipment output AuxPwr[0] of the auxiliary equipment 28 is greater than the auxiliary equipment output AuxPwr[1] of the auxiliary equipment 128, the correction amount CordH2SOC[0] of the residual amount of fuel of the load 20 is decreased by the auxiliary equipment output correction amount CorAux[0], and the correction amount CordH2SOC[1] of the residual amount of fuel of the load 120 is increased by the auxiliary equipment output correction amount CorAux[1] (step S6).

By means of such a control, since the stored electrical power Pbat supplied to the load 20 from the BAT converter 52 of the BAT system 22 decreases, the output of the electrical power storage device 50 on the side of the auxiliary equipment 28 (recalculation of ReqPwrBAT: step S7) can be reduced (the electrical power supplied from the electrical power storage device 50 to the auxiliary equipment 28 does not change). On the other hand, since the stored electrical power Pbat supplied to the load 120 from the BAT converter 152 of the BAT system 122 on the side of the auxiliary equipment 128 increases, the output of the electrical power storage device 50 on the side of the auxiliary equipment 128 (recalculation of ReqPwrBAT: step S7) can be made to increase (the electrical power supplied from the electrical power storage device 150 to the auxiliary equipment 128 does not change).

Due to being controlled in this manner, the process of decreasing the difference in the residual amount of electrical power storage between the electrical power storage devices 50 and 150 over time can be carried out.

Moreover, it should be noted that, for example, at a time when the fuel cell vehicle 13 is idling, the electrical power storage amount (the residual amount of electrical power storage) of the electrical power storage device 50 (150) can be increased by being charged with the generated electrical power Pfc of the FC systems 218 and 318 (418 and 518), and can be maintained at a predetermined electrical power storage amount (SOC).

Exemplary Modification

The above-described embodiment can be modified in the following manner.

Configuration of Exemplary Modification

Figure 6:
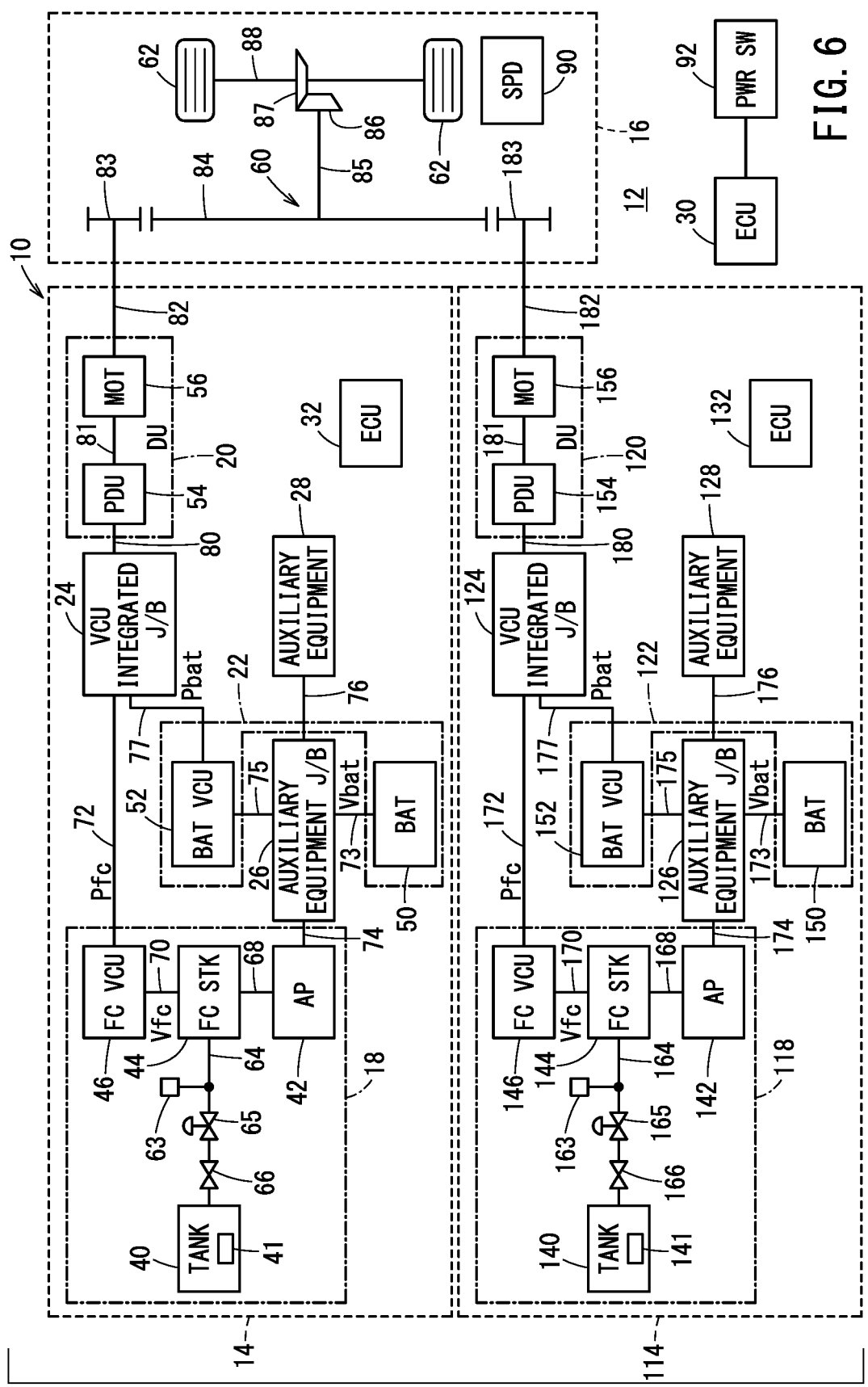
FIG. 6 is a schematic configuration diagram of a fuel cell vehicle according to an exemplary modification which is equipped with an output integration system for a fuel cell engine according to an exemplary modification.

FIG. 6 is a schematic configuration diagram of a fuel cell vehicle 12 according to an exemplary modification, which is equipped with an output integration system 10 according to the exemplary modification.

Moreover, in the fuel cell vehicle 12 according to the exemplary modification, which is equipped with the output integration system 10 according to the exemplary modification, the same reference numerals will be applied in relation to the same configurations or configurations corresponding to the output integration system 11 and the fuel cell vehicle 13 of the above-described embodiment, and only portions differing therefrom will be described.

As shown in FIG. 6, the output integration system 10 includes two FC engines 14 and 114.

As can be understood by comparing FIG. 6 and FIG. 1, the output integration system 10 according to the exemplary modification differs in comparison with the output integration system 11 according to the embodiment (see FIG. 1), in that the FC systems of the FC engines 14 and 114 are each constituted by one individual FC system 18 or 118, and the fuel tanks of the FC engines 14 and 114 are each constituted by one individual fuel tank 40 or 140.

The one FC engine 14 is equipped with one FC system 18, the BAT system 22, the load 20, the integrated connector 24, the auxiliary equipment connector 26, the auxiliary equipment 28, and the control device 32.

The other FC engine 114 is equipped with the FC system 118, the BAT system 122, the load 120, the integrated connector 124, the auxiliary equipment connector 126, the auxiliary equipment 128, and the control device 132.

In the one FC engine 14 and the other FC engine 114, the constituent elements thereof are the same except for the auxiliary equipment 28 and 128. In the auxiliary equipment 28 of the FC engine 14, there are included, for example, an in-vehicle air conditioner and an electric steering device, and in the auxiliary equipment 128 of the FC engine 114, differing from these features, there are included, for example, a heater for heating and a cargo compartment refrigerator.

The FC system 18 that constitutes the one FC engine 14 includes an FC stack 44. There are included therein an air pump 42 that communicates with a cathode inlet of this FC stack 44 through a passage 68, a fuel tank 40 that communicates with an anode inlet of the FC stack 44 through a passage 64, and an FC converter (FC VCU) 46 that is electrically connected through a line 70 between voltage output terminals of the FC stack 44. The output terminals of the FC converter 46 are electrically connected through a line 72 to the integrated connector 24.

A pressure sensor 41 that measures the pressure in the fuel tank 40 is attached to the fuel tank 40. Between the fuel tank 40 and the anode inlet of the FC stack 44, a valve 66, a pressure reducing valve 65, and a pressure sensor 63 are arranged in this order sequentially from the side of the fuel tank 40.

The BAT system 22 includes an electrical power storage device (battery: BAT) 50 and a BAT converter (also referred to as a BAT VCU) 52 which is a step-up/step-down converter.

A stored voltage Vbat of the electrical power storage device 50 passes through the line 73, the auxiliary equipment connector 26, and the line 75, and is supplied to the other input terminal of the integrated connector 24 via a line 77 as a high-voltage stored electrical power Pbat that is boosted in voltage through the BAT converter 52. The load 20 comprises an inverter (also referred to as a PDU) 54 and a motor (MOT) 56 which is a main machine.

The generated electrical power Pfc generated by the FC stack 44 is supplied to the load 20 at a time of traveling or the like through the FC converter 46 and the integrated connector 24, and at a time of idling or the like of the FC system 18, the electrical power is stepped down by the BAT converter 52 through the integrated connector 24, and the stepped-down electrical power charges (stores electricity in) the electrical power storage device 50 through the auxiliary equipment connector 26.

Furthermore, at a time of decelerating when an accelerator pedal (not shown) of the fuel cell vehicle 12 is released, a regenerative electrical power of the motor 56 charges the electrical power storage device 50 through the inverter 54, the integrated connector 24, the BAT converter 52, and the auxiliary equipment connector 26.

The BAT converter 52 is a bi-directional converter that is capable of switching between supplying electrical power in a stepped-up direction from the electrical power storage device 50 to the load 20, and supplying electrical power in a stepped-down direction from the FC system 18 and/or the load 20 to the electrical power storage device 50.

The air pump 42 and the auxiliary equipment 28 are operated using the stored electrical power Pbat of the electrical power storage device 50 as input electrical power. In practice, the air pump 42 also operates as auxiliary equipment, and therefore, hereinafter, in the electrical power of the auxiliary equipment 28, the electrical power of the air pump 42 may also be included.

The FC system 118 that constitutes the other FC engine 114 includes an FC stack 144. There are included therein an air pump 142 that communicates with a cathode inlet of this FC stack 144 through a passage 168, a fuel tank 140 that communicates with an anode inlet of the FC stack 144 through a passage 164, and an FC converter 146 which is a voltage boosting converter that is electrically connected through a line 170 between voltage output terminals of the FC stack 144. The output terminals of the FC converter 146 are electrically connected through a line 172 to the integrated connector 124.

A pressure sensor 141 that measures the pressure in the fuel tank 140 is attached to the fuel tank 140. Between the fuel tank 140 and the anode inlet of the FC stack 144, a valve 166, a pressure reducing valve 165, and a pressure sensor 163 are arranged in this order sequentially from the side of the fuel tank 140.

The BAT system 122 that makes up the other engine 114 is equipped with an electrical power storage device 150 and a BAT converter 152.

The electrical power storage devices 50 and 150 may be secondary batteries such as lithium ion batteries and/or capacitors.

The load 120 that makes up the other engine 114 is equipped with the inverter 154 and the motor 156.

The propulsion mechanism 16, which is connected to the main shaft 82 of the motor 56 of the engine 14 and the main shaft 182 of the motor 156 of the engine 114, is equipped with the speed reducing mechanism 60 and the vehicle wheels 62.

The generated electrical power Pfc [W] and the stored electrical power Pbat [W] of each of the engines 14 (114) are supplied to the loads 20 (120), either separately or in an integrated (combined) manner through the integrated connectors 24 (124). The inverters 54 (154), at a time of so-called powered traveling, convert the DC electrical power into AC electrical power, and supply the same to the motors 56 (156).

The AC electrical power rotates the motors 56 (156), and the main shafts 82 (182) are rotationally driven.

The fuel cell vehicle 12 runs through the propulsion mechanism 16 due to a combined rotational driving force of the main shafts 82 (182) of the motors 56 (156) of the engines 14 (114).

In this case, the gear 83 (183) is enmeshed with the gear 84. The gear 84 is connected to the vehicle wheels 62 via a drive shaft 85, differential gears 86 and 87, and an axle 88.

The one engine 14 is equipped with a control device 32. The other engine 114 is equipped with a control device 132. The fuel cell vehicle 12 is equipped with a control device 30.

Each of the control devices 30, 32, and 132 is constituted, respectively, by an ECU (Electronic Control Unit). The ECU is a computer including a microcomputer, and includes a CPU (central processing unit) as a processor, a ROM (including an EEPROM) as a memory, a RAM (random access memory), and apart therefrom, input/output devices such as an A/D converter and a D/A converter, and a timer serving as a timekeeping unit. One or more of the CPUs, by reading out and executing programs stored in the ROM, functions as various function implementing units (function implementing means), for example, such as a control unit, a computation unit, and a processing unit. These functions can also be realized by hardware.

The control device 32 that controls the engine 14 is connected to each of the respective constituent elements that make up the engine 14 through non-illustrated signal lines and control lines. The control device 32, in addition to the pressure sensors 41 and 63, is connected to various sensors such as non-illustrated voltage sensors, current sensors, temperature sensors, and rotational speed sensors.

Similarly, the control device 132 that controls the engine 114 is connected to each of the respective constituent elements that make up the engine 114 through non-illustrated signal lines and control lines. The control device 132, in addition to the pressure sensors 141 and 163, is connected to various sensors such as non-illustrated pressure sensors, voltage sensors, current sensors, temperature sensors, and rotational speed sensors.

The control devices 32 and 132 are connected by communication lines (not shown) to the control device (also referred to as a supervisory control device) 30 that controls the output integration system 10 and the fuel cell vehicle 12, and are capable of sharing mutual data and calculation results in real time by way of communication.

The control device 30, in addition to being connected to the vehicle speed sensor 90 and a power switch (PWR SW) 92, which is a power source ON/OFF switch of the fuel cell vehicle 12, is also connected respectively to switch sensors such as a non-illustrated accelerator pedal sensor and a brake pedal sensor, together with being connected to the propulsion mechanism 16 and a non-illustrated electric power steering device or the like.

The control devices 32 and 132 and the control device 30 execute programs, and control the FC systems 18 and 118, the BAT systems 22 and 122, the auxiliary equipment 28 and 128, the integrated connectors 24 and 124, the auxiliary equipment connectors 26 and 126, and the loads 20 and 120, in accordance with the switched position of the switch, and the physical quantities detected by the sensors.

The control devices 32 and 132 may also be integrated together as one unit in the control device 30.

In order to avoid complexity and to facilitate understanding, in the following description, it is assumed that the output integration system 10 including the engines 14 and 114 and the fuel cell vehicle 12 which is equipped with the propulsion mechanism 16 are controlled by the integrated control device 30.

For example, the control device 30 is capable of setting the generated voltage Vfc (the generated current Ifc, the generated electrical power Pfc) of the FC stacks 44 (144) by controlling the FC converters 46 (146) on the basis of the stored voltage Vbat of the electrical power storage devices 50 (150).

Operations of Exemplary Modification

Next, a description will be given with reference to the flow chart shown in FIG. 7 concerning operations of the fuel cell vehicle 12 according to the exemplary modification, which is equipped with the output integration system 10 according to the exemplary modification and is constituted basically in the manner described above. A controlling entity is the control device 30, unless otherwise specified.

Moreover, it should be noted that, in the flow chart of FIG. 7, the processing content which corresponds to or the processing content that is identical to that of the steps in the flowchart shown in FIG. 3 is described in a simplified manner and the same step numbers are applied thereto.

Moreover, the present control is executed during a state in which the power switch 92 is in the ON position, and the FC systems 18 and 118 are generating electrical power. In this case, the fuel cell vehicle 12 is in an operating state during traveling or during idling. During idling, the FC systems 18 and 118 are in a state of generating a small amount of electrical power.

Surplus electrical power generated during traveling and electrical power generated during idling is charged to the electrical power storage devices 50 (150) via the FC converters 46 (146), the integrated connectors 24 (124), the BAT converters 52 (152), and the auxiliary equipment connectors 26 (126). The stored electrical power in the electrical power storage devices 50 (150) is supplied to the air pumps 42 (142) through the lines 74 (174) via the auxiliary equipment connectors 26 (126), and to the various auxiliary equipment 28 (128) through the lines 76 (176).

In step S1 of FIG. 7, the control device 30 calculates the required output (required vehicle output, required driving force, required vehicle driving force) ReqPwrVeh [W] of the propulsion mechanism 16 of the fuel cell vehicle 12. The required output ReqPwrVeh of the fuel cell vehicle 12 is calculated based on, for example, the current vehicle speed VehSpd as measured by the vehicle speed sensor 90, a slope of the road, and a target vehicle speed calculated from a degree of opening of the accelerator pedal or the like.

In step S2 of FIG. 7, as shown in formula (1) which is restated, the required output ReqPwrDU[0] for the load 20 (where [0] indicates an index indicating a side of the engine 14; hereinafter, such numbering is applied in the same manner), and the required output ReqPwrDU[1] for the load 120 (where [1] indicates an index indicating a side of the engine 114; hereinafter, such numbering is applied in the same manner) are calculated (distributed), in a manner so that the combined output (total output) of both of the engines 14 and 114 can cover the required output ReqPwrVeh [W] of the fuel cell vehicle 12.

$$ReqPwrVeh=ReqPwrDU[0]+ReqPwrDU[1] \quad (1)$$

In step S2 of FIG. 7, at the same time, as shown in formula (32), the generated electrical output ReqPwrFC[0] of the FC system 18 ([0] is an index indicating the generated electrical output ReqPwrFC of the FC system 18, the same applies hereinafter), and the electrical power storage output (battery output) ReqPwrBAT[0] of the BAT system 22 ([0] is an index indicating the electrical power storage output ReqPwrBAT of the BAT system 22, the same applies hereinafter) is calculated in order to cover the required output ReqPwrDU[0] [W] for the load 20.

$$ReqPwrDU[0]=ReqPwrFC[0]+ReqPwrBAT[0] \quad (32)$$

At the same time, in step S2 of FIG. 7, as shown in formula (33), the generated electrical output ReqPwrFC[1] of the FC system 118, and the electrical power storage output (battery output) ReqPwrBAT[1] of the BAT system 122 ([1] is an index indicating the electrical power storage output ReqPwrBAT of the BAT system 122, the same applies hereinafter) are calculated in order to cover the required output ReqPwrDU[1] [W] for the load 120.

$$ReqPwrDU[1]=ReqPwrFC[1]+ReqPwrBAT[1] \quad (33)$$

Next, in step S3 of FIG. 7, with respect to the required outputs ReqPwrDU[0] and ReqPwrDC[1] of the loads 20 and 120, the load correction amount (also referred to as a DU correction amount) CorDU [W]=DU·Correction(b) (b is the number of the engines, and in the present exemplary modification, b=2) is calculated in order to determine whether or not the correction process between the engines 14 and 114, which will be described next, is required.

Moreover, the DU correction process between the engines 14 and 114 is a process that is carried out in order to eliminate or reduce (equalize) a difference between the residual amounts of fuel in the fuel tank 40 and the fuel tank 140 of the engines 14 and 114 during generation of electrical power by the FC systems 18 and 118 of the fuel cell vehicle 12, by correcting (adjusting) a distributed amount of the output electrical power for the loads (DU) 20 (120).

To describe the DU correction process between the engines 14 and 114 in slightly greater detail, within the engines 14 and 114, in order to quickly reduce the residual amount of fuel in the fuel tank of one of the engines in which the residual amount of fuel remaining therein is large, there is a process of relatively increasing the load (DU) output ReqPwrDU[ ] of the one engine in which the residual amount of fuel remaining therein is large, while on the other hand, in order to delay the reduction in the fuel of the fuel tank of the other engine in which the residual amount of fuel is small, there is a process of relatively reducing the load (DU) output ReqPwrDU[ ] of the other engine in which the residual amount of fuel is small.

By carrying out such a process, the difference between the residual amount of fuel in the fuel tank of the one engine and the residual amount of fuel in the fuel tank of the other engine can be reduced over time.

As was discussed above, FIG. 4 is a detailed flow chart provided in relation to a process of calculating the load correction amount CorDU=DU·Correction(b) (b indicates the number of the engines) in order to correct (adjust) the output electrical power of the loads (DU) 20 (120), in order to reduce the difference in the residual amount of fuel between the engines 14 and 114 in step S3 of FIG. 7.

In step S3a of FIG. 4, the average value aveH2SOC [Pa] of the residual amount of fuel is calculated based on the pressure of the fuel tanks 40 (140) detected by the pressure sensors 41 (141) (the residual amount of fuel H2SOC[0] and the residual amount of fuel H2SOC[1]).

As shown in the restated formula (4), the average value aveH2SOC [Pa] of the residual amount of fuel is calculated as an average value of the residual amount of fuel H2SOC[0] [Pa] in the fuel tank 40, and the residual amount of fuel H2SOC[1] [Pa] in the fuel tank 140.

$$aveH2SOC=(H2SOC[0]+H2SOC[1])/2 \qquad (4)$$

In step S3b, from the detected values of the non-illustrated voltage sensors and the current sensors, the output AuxPwr[0] of the auxiliary equipment 28, and the output AuxPwr[1] of the auxiliary equipment 128 are acquired, and as shown in the restated formula (5), the average value aveAux [W] of the auxiliary equipment output, which is an average value, is calculated.

$$aveAux=(AuxPwr[0]+AuxPwr[1])/2 \qquad (5)$$

In this instance, as well as in the flow chart, the indexes of the engines 14 and 114 are taken to be i (i=0, 1), and the number of the engines of the engines 14 and 114 is taken to be b (b=2).

In step S3c, the index i is set to i=0 (initially, the engine 14).

In step S3d, a determination is made as to whether or not the index i is less than the number of engines b (i<b).

In the first time that this determination is made, step S3d is affirmative (step S3d: YES), and the process proceeds to step S3e.

In step S3e, the difference in the residual amount of fuel dH2SOC [Pa] of the engine 14 whose index i is i=0 is calculated by the restated formula (6).

$$dH2SOC = H2SOC[i] - aveH2SOC \qquad (6)$$
$$= H2SOC[0] - aveH2SOC$$

Stated otherwise, the difference in the residual amount of fuel dH2SOC of the engine 14 is calculated as a value obtained by subtracting the average value aveH2SOC of the residual amount of fuel in the fuel tank 40 (step S3a) from the residual amount of fuel H2SOC[0] in the fuel tank 40 of the engine 14 specified by the index i (i=0).

Next, in step S3f, a correction amount CordH2SOC [W] of the residual amount of fuel (adjustment amount of the residual amount of fuel) in order to correct (adjust) the difference in the residual amount of fuel dH2SOC [Pa] calculated in step S3e by the load 20 of the engine 14 is calculated (converted) by the restated formula (7).

$$CordH2SOC=dH2SOC \times GainH2SOC \qquad (7)$$

In this instance, the GainH2SOC [W/Pa] is a corrective gain (conversion factor), and is a ratio (ΔDU/ΔH2) between a unit fuel increment ΔH2 [Pa] of the fuel gas within the FC stacks 44 (144), which is supplied from the fuel tanks 40 (140) through the pressure reducing valves 65 (165), and a unit output increment ΔDU [W] for the loads 20 (120). Such a ratio is measured in advance as a characteristic (map) of an incremental function, and is recorded as a map in the storage device of the control device 30 (32).

Next, in step S3g, the auxiliary equipment output correction amount CorAux[0] [W] of the auxiliary equipment 28 is calculated by the restated formula (8) as a difference in the auxiliary equipment output of the engine 14.

$$CorAux[0] = aveAux - AuxPwr[i] \qquad (8)$$
$$= aveAux - AuxPwr[0]$$

Stated otherwise, the auxiliary equipment output correction amount CorAux of the engine 14 is calculated as a value obtained by subtracting the output AuxPwr[0] of the auxiliary equipment 28 of the engine 14 specified by the index i (i=0) from the average value aveAux of the auxiliary equipment output, which is the average value of the auxiliary equipment output AuxPwr[0] of the auxiliary equipment 28 (including the input electrical power of the air pump 42), and the auxiliary equipment output AuxPwr[1] of the auxiliary equipment 128 (including the input electrical power of the air pump 142).

Next, in step S3h, by means of the restated inequality (9), a determination is made as to whether or not the correction amount CordH2SOC (CordH2SOC[0]) of the residual amount of fuel is less than or equal to a predetermined threshold value Ghs [Pa].

$$CordH2SOC[0] \leq Ghs \qquad (9)$$

In the case of being less than or equal to the threshold value Ghs (step S3h: YES), it is assumed that the correction amount is small, and the difference in the residual amount of fuel is small.

In this case, in step S3i, the correction amount CorOutBank (CorOutBank[0]) [W] is set to only the auxiliary equipment output correction amount CorAux with respect to the auxiliary equipment 28, as shown in formula (10).

$$CorOutBank[0]=CorAux[0] \qquad (10)$$

In the case of being greater than the threshold value Ghs (step S3h: NO), then in step S3j, the engine correction amount CorOutBank (CorOutBank[0]) [W] is set, as shown in formula (11), to a value obtained by adding the auxiliary equipment output correction amount CorAux with respect to the auxiliary equipment 28 calculated in step S3g, and the correction amount CordH2SOC (CordH2SOC[0]) of the residual amount of fuel calculated in step S3f.

$$CorOutBank[0]=CorAux[0]+CordH2SOC[0] \qquad (11)$$

More specifically, in the case that the correction amount CordH2SOC of the residual amount of fuel exceeds the threshold value Ghs (step S3h: NO), the engine correction amount CorOutBank is set to a total correction amount of the auxiliary equipment output correction amount CorAux and the correction amount CordH2SOC of the residual amount of fuel.

Next, in step S3k, as shown in formula (12), a determination is made as to whether or not the vehicle speed VehSpd [m/s] acquired from the vehicle speed sensor 90 is of a value in excess of a threshold value Gvs [m/s], and a required output (required driving force) ReqPwrVeh [W] (step S1) of the vehicle 12 is of a value in excess of a threshold value Gvp [W].

$$VehSpd>Gvs \ \& \ ReqPwrVeh>Gvp \qquad (12)$$

In this case, in the case that at least one of the conditions of the left side or the right side of the "&" in formula (12) is not satisfied (step S3k: NO), then in step S31, as shown in formula (13), the load correction amount CorDU(CorDU[0]) is set to 0, and the correction (adjustment) is not implemented.

$$CorDU[0]=0 \quad (13)$$

This is because, in a state in which the fuel cell vehicle 12 is stopped, such as during idling, or alternatively, when traveling at a low speed [m/s] less than or equal to the threshold value Gvs [m/s], since the generated electrical power Pfc generated by the FC system 18 is small, even with such a correction (adjustment), it is difficult to obtain in a short time period an effect of the correction (adjustment), or stated otherwise, an effect of reducing the residual amount of fuel in the fuel tank 40.

On the other hand, under a condition of "step S3k: YES", then in step S3m, as shown in the restated formula (14), the load correction amount CorDU[i] in order to implement the adjustment (correction) of the required load output, which is the electrical power consumption amount for the load 20, is calculated.

$$CorDU[i] = CorDU[0] \quad (14)$$
$$= CorOutBank[0]$$

In the first instance of step S3m, the correction (adjustment) corresponding to the correction amount CorOutBank set in step S3i or step S3j is placed in a state that is capable of being implemented with respect to the load 20 of the engine 14 designated by the index i=0.

In actuality, at this time, substantially simultaneously therewith, the correction (adjustment) corresponding to the correction amount CorOutBank, which will be described next, is placed in a state that is capable of being implemented with respect to the load 120 of the other engine 114.

More specifically, in step S3n, while incrementing the index i by 1, in a manner so that i=i+1=1 (the engine 114), execution of the process is carried out from step S3d: YES→step S3e→step S3f→step S3g→step S3h→(step S3i or step S3j)→step S3k→(step S31 or step S3m)→step S3n (i=2)→step S3d (where i=2 and b=2, i<b?): NO.

Accordingly, in the second instance of step S3m, the correction (adjustment) corresponding to the correction amount CorOutBank set in step S3i or step S3j is placed in a state that is capable of being implemented with respect to the load 120 of the engine 114 designated by the index i=1, whereupon the process proceeds to step S4 of FIG. 7.

Next, in step S4 of FIG. 7, the index i is set to i=0 (the engine 14).

In step S5, a determination is made as to whether or not the index i is less than the number of engines b (i<b).

Thereafter, after step S5: YES, the steps are carried out from the later-described step S6, step S7, step S8 (i=i+1=1: engine 114), step S5: YES, step S6, step S7, step S8 (i=i+1=2), and step S5 (where i=2 and b=2, i<b?): NO, whereupon the process comes to an end.

In the process of the second instance of step S6, the corrected engine output required value CorPwrDU[0] for the load 20 of the engine 14 is calculated by formula (16), and the corrected engine output required value CorPwrDU[1] for the load 120 of the engine 114 is calculated by formula (17).

$$CorPwrDU[0]=ReqPwrDU[0]+CorDU[0] \quad (16)$$

$$CorPwrDU[1]=ReqPwrDU[1]+CorDU[1] \quad (17)$$

In formula (16), in order to correct (adjust) the difference in the residual amount of fuel between the fuel tanks 40 and 140, the corrected engine output required value CorPwrDU[0] that is set for the load 20 of the one engine 14 is calculated. The corrected engine output required value CorPwrDU[0] is a value obtained by adding the load correction amount CorDU[0] calculated in step S3m to the required output ReqPwrDU[0] for the load 20 calculated in step S2.

In formula (17), in order to correct (adjust) the difference in the residual amount of fuel between the fuel tanks 40 and 140, the corrected engine output required value CorPwrDU[1] which corrects (adjusts) the difference in the residual amount of fuel between the fuel tanks 40 and 140, which is set for the load 120 of the other engine 114, is calculated. The corrected engine output required value CorPwrDU[1] is a value obtained by adding the load correction amount CorDU[1] calculated in step S3m to the required output ReqPwrDU[1] for the load 120 calculated in step S2.

In this case, it should be noted that the auxiliary equipment output correction amount CorAux[0] for the auxiliary equipment 28 which is calculated in the first instance of step S3g, and the auxiliary equipment output correction amount CorAux[1] for the auxiliary equipment 128 which is calculated in the second instance of step S3g, respectively, are values obtained by subtracting the auxiliary equipment output AuxPwr[0] for the auxiliary equipment 28 or the auxiliary equipment output AuxPwr[1] for the auxiliary equipment 128 from the auxiliary equipment output average value aveAux, and therefore, the positive and negative signs thereof are reversed while the values thereof are equal.

Further, it should be noted that the correction amount CordH2SOC[0] of the residual amount of fuel, and the correction amount CordH2SOC[1] of the residual amount of fuel are values obtained by multiplying the corrective gain GainH2SOC (a positive value) by a value obtained by having subtracted the residual amount of fuel H2SOC[0] of the fuel tank 40 or the residual amount of fuel H2SOC[1] of the fuel tank 140 from the average value of the residual amount of fuel aveH2SOC (step S3e, step S3f), and therefore, the positive and negative signs thereof are reversed while the values thereof are equal.

More specifically, the load correction amount CorDU[0] and the load correction amount CorDU[1] in formulas (16) and (17) have opposite signs and are equal in value.

Therefore, in the case that the corrected engine output required value CorPwrDu[0] for the load 20 of the engine 14, and the corrected engine output required value CorPwrDu[1] for the load 120 of the engine 114 are set as shown in formula (16) and formula (17), and the load required output, which is the electrical power consumption amount for the load 20 and the load 120 is adjusted (corrected), the required output (required driving force), ReqPwrVeh [W] for the propulsion mechanism 16 of the fuel cell vehicle 12 remains unchanged.

Stated otherwise, without changing the driving force of the fuel cell vehicle 12, a correction (adjustment) can be carried out to reduce or eliminate the difference in the residual amount of fuel and/or the difference in the auxiliary equipment output.

Next, in step S7, the generated electrical output ReqPwrFC[0] of the FC system 18 and the electrical power storage output (battery output) ReqPwrBAT[0] of the BAT system 22 are recalculated in order to cover the required output CorPwrDU[0] of the load 20 of the engine 14 in step S6.

The control device 30 controls the FC system 18 and the BAT system 22 by means of the recalculated values.

Simultaneously therewith, in step S7, the generated electrical output ReqPwrFC[1] of the FC system 118 and the electrical power storage output (battery output) ReqPwrBAT[1] of the BAT system 122 are recalculated in order to cover the required output CorPwrDU[1] of the load 120 of the engine 114 in step S6.

The control device 30 controls the FC system 118 and the BAT system 122 by means of the recalculated values.

In actuality, after step S5: NO, the control device 30 sets and controls the load output of the load 20 on the basis of the corrected amount in step S6, and controls the FC system 18 and the BAT system 22 in accordance with the load output of the load 20 due to the recalculated values in step S7. Simultaneously therewith, the control device 30 sets and controls the load output of the load 120 on the basis of the corrected amount in step S6, and sets and controls the FC system 118 and the BAT system 122 in accordance with the load output of the load 120 due to the recalculated values in step S7.

In this manner, in the correction process according to the exemplary modification, within both of the FC engines 14 and 114, in order to quickly reduce the residual amount of fuel in the fuel tanks 40 and 140 of one of the FC engines in which the residual amount of fuel remaining therein is large, there is a process of relatively increasing the load (DU) output of the one FC engine in which the residual amount of fuel remaining therein is large, while on the other hand, in order to delay the reduction in the fuel of the fuel tank of the other engine in which the residual amount of fuel is small, there is a process of relatively reducing the load (DU) output of the other FC engine in which the residual amount of fuel is small.

By carrying out such a process, considering the one FC engine, for example, the FC engine 14, the difference between the residual amount of fuel in the fuel tank 40 of this FC engine 14, and the residual amount of fuel in the fuel tank 140 of the other FC engine, namely, the FC engine 114, can be reduced over time. In accordance with this feature, the operable time period of the output integration system 10 (the fuel cell vehicle 12) can be lengthened.

Invention that can be Grasped from the Embodiment and the Exemplary Modification In this instance, the invention that is capable of being grasped from the above-described embodiment and the above-described exemplary modification will be described below. Moreover, in order to facilitate understanding, although the reference numerals used in the above-described embodiment and the above-described exemplary modification are applied to portions of the constituent elements, such constituent elements are not limited to those to which such reference numerals have been applied.

The output integration system 10 according to the present invention is the output integration system 10 for a plurality of fuel cell engines. The output integration system 10 is configured to integrate the outputs from the plurality of fuel cell engines 14 and 114, wherein each of the fuel cell engines 14 and 114 includes the fuel cell stack 44 or 144, the fuel tank 40 or 140 configured to store the fuel gas supplied to the fuel cell stack, and the load 20 or 120 configured to be supplied with the electrical power from the fuel cell stack 44 or 144, and to generate the driving force, and the output integration system 10 includes the control device 30, 32, or 132 provided at the interior or the exterior of the fuel cell engines, and wherein the control device acquires a difference in the residual amount of fuel in the fuel tanks 40 and 140 between the fuel cell engines 14 and 114, and adjusts the required load output, which is the electrical power consumption amount of each of the loads 20 and 120, so as to reduce the difference.

The required output (electrical power consumption amount) of each of the respective loads 20 and 120 to which the electrical power generated by the fuel cell stacks 44 and 144 is supplied is adjusted, in a manner so that a difference in the residual amount of fuel in the fuel tanks 40 and 140 between the fuel cell engines 14 and 114 is reduced. In accordance with such a configuration, the residual amount of fuel in the fuel tanks 40 and 140 of each of the fuel cell engines 14 and 114 can be equalized. In accordance with this feature, the operable time period of the output integration system 10 made up of the plurality of fuel cell engines 14 and 114 can be lengthened.

Further, in the output integration system 10, the control device 30 sets the difference in the residual amount of fuel in the fuel tanks 40 and 140 between the fuel cell engines 14 and 114 to a value obtained by subtracting the average value of the residual amounts of fuel in the respective fuel cell engines from the residual amount of fuel in each of the fuel cell engines 14 and 114.

In accordance with such a configuration, since the required output of the fuel cell engine in which the residual amount of fuel is large is adjusted so as to be increased, the required output of the fuel cell engine in which the residual amount of fuel is small is adjusted so as to be decreased, and the total value of the adjustment amounts becomes zero, even if the adjustment to reduce the difference in the residual amount of fuel is performed, the required output of each of the loads remains unchanged.

Furthermore, in the output integration system 11, in the case that each of the fuel cell engines 214 and 314 includes the plurality of the fuel cell stacks (44, 344) and (144, 544), and each of the fuel tanks that supplies the fuel to each of the fuel cell stacks (44, 344) and (144, 544) is constituted by the plurality of the fuel tanks {(40, 250, 256), (340, 350, 360)} and {(140, 450, 460), (440, 550, 560)}, the control device 30 acquires the difference in the residual amount of fuel between the plurality of the fuel tanks {between (40, 250, 256) and (340, 350, 360)}, {between (140, 450, 460) and (440, 550, 560)} that supply fuel to each of the fuel cell stacks (44, 344) and (144, 544), and adjusts the electrical power output of each of the fuel cell stacks (44, 344) and (144, 544) within each of the fuel cell engines, so as to reduce the difference.

In accordance with such features, equalization of the residual amount of fuel in the fuel tanks between the fuel cell engines 214 and 314 is performed by adjusting the electrical power consumption amount of the loads 20 and 120, and equalization of the residual amount of fuel within the fuel tanks within the fuel cell engines 214 and 314 is performed by adjusting the electrical power output of the fuel cell stacks within each of the engines.

Therefore, it is possible to equalize the residual amount of fuel in all of the fuel tanks {(40, 250, 256), (340, 350, 360)} and {(140, 450, 460), (440, 550, 560)} that constitute the output integration system 11. In accordance with this feature, the operable time period of the output integration system 11 can be lengthened.

Still further, in the output integration system 11, the control device 30 may set the difference {the difference between the fuel tanks (40, 250, 260) and the fuel tanks (340, 350, 360), the difference between the fuel tanks (140, 450, 460) and the fuel tanks (440, 550, 560)} in the residual amount of fuel in the fuel tanks between the fuel cell stacks {(44, 344), (144, 544)} within the fuel cell engines 214 and 314 to a value obtained by subtracting the residual amount of fuel of the fuel tanks of each of the fuel cell stacks from the average value of the residual amounts of fuel in the fuel tanks of each of the fuel cell stacks within each of the fuel cell engines (214 and 314). In accordance with such features, since the total value of the adjustment amounts of the required output of the respective fuel cell stacks that constitute the fuel cell engine is a value of zero, even if the difference in the residual amount of fuel in each of the fuel cell stacks is adjusted, the combined output of each of the fuel cell stacks does not change.

Further still, in the fuel cell vehicle 12 or 13 in which the output integration system 10 or 11 is installed, and in which the traction motor 56 or 156 is included as the load, there may be provided the vehicle speed acquisition unit (the vehicle speed sensor 90) configured to acquire the vehicle speed of the fuel cell vehicle 12 or 13, and the required electrical power acquisition unit (step S1) configured to acquire the required electrical power of the traction motor, wherein, in the case that the vehicle speed is greater than or equal to the set value, and the required electrical power of the traction motor is greater than or equal to the threshold value, the control device may adjust the required load output.

In accordance with such features, since the load request output is adjusted in the case that the vehicle speed is greater than or equal to the set value, and the electrical power required for the traction motor is greater than or equal to the threshold value, during traveling it is possible to equalize the residual amount of fuel in the fuel tanks of each of the fuel cell engines.

Moreover, the present invention is not limited to the embodiment and the exemplary modification described above, and without deviating from the essence and gist of the present invention, various alternative or additional configurations can be adopted therein. For example, the number of the engines may be greater than or equal to three, or the number of the fuel cell stacks within the engines may be greater than or equal to three, and the like.

What is claimed is:

1. An output integration system for a plurality of fuel cell engines, the output integration system configured to integrate outputs from the plurality of fuel cell engines, the output integration system comprising one or more processors that are provided at an interior or an exterior of the fuel cell engines and execute computer-executable instructions stored in a memory,
   wherein each of the fuel cell engines comprises:
   a fuel cell stack;
   a fuel tank configured to store a fuel gas supplied to the fuel cell stack; and
   a load configured to be supplied with electrical power from the fuel cell stack, and to generate a driving force, and
   wherein the one or more processors execute the computer-executable instructions to cause the output integration system to:
   acquire a difference in a residual amount of fuel in the fuel tanks between the plurality of fuel cell engines;
   adjust a required load output, which is an electrical power consumption amount of each of the loads, so as to reduce the difference; and
   in a case that each of the fuel cell engines includes a plurality of the fuel cell stacks, and each of the fuel tanks that supplies fuel to each of the fuel cell stacks is constituted by a plurality of fuel tanks, acquire a difference in the residual amount of fuel between the plurality of the fuel tanks that supply fuel to each of the fuel cell stacks, and adjust the electrical power output of each of the fuel cell stacks within each of the fuel cell engines, so as to reduce the difference.

2. The output integration system according to claim 1, wherein the one or more processors execute the computer-executable instructions to cause the output integration system to set the difference in the residual amount of fuel in the fuel tanks between the plurality of fuel cell engines to a value obtained by subtracting an average value of the residual amounts of fuel in the respective fuel cell engines from the residual amount of fuel in each of the fuel cell engines.

3. The output integration system according to claim 1, wherein:
   the one or more processors execute the computer-executable instructions to cause the output integration system to set the difference in the residual amount of fuel in the fuel tanks between the fuel cell stacks within the fuel cell engines to a value obtained by subtracting the residual amount of fuel of the fuel tanks of each of the fuel cell stacks from an average value of the residual amounts of fuel in the fuel tanks of each of the fuel cell stacks within each of the fuel cell engines.

4. The output integration system according to claim 2, wherein:
   the one or more processors execute the computer-executable instructions to cause the output integration system to set the difference in the residual amount of fuel in the fuel tanks between the fuel cell stacks within the fuel cell engines to a value obtained by subtracting the residual amount of fuel of the fuel tanks of each of the fuel cell stacks from an average value of the residual amounts of fuel in the fuel tanks of each of the fuel cell stacks within each of the fuel cell engines.

5. A fuel cell vehicle in which an output integration system for a plurality of fuel cell engines is installed, and including a traction motor as a load, the fuel cell vehicle comprising:
   a vehicle speed acquisition unit configured to acquire a vehicle speed of the fuel cell vehicle,
   wherein the output integration system is configured to integrate outputs from the plurality of fuel cell engines, and the output integration system comprises one or more processors that are provided at an interior or an exterior of the fuel cell engines and execute computer-executable instructions stored in a memory,
   wherein each of the fuel cell engines comprises:
   a fuel cell stack;
   a fuel tank configured to store a fuel gas supplied to the fuel cell stack; and
   the load configured to be supplied with electrical power from the fuel cell stack, and to generate a driving force, and
   wherein the one or more processors execute the computer-executable instructions to cause the output integration system to:
   acquire a difference in a residual amount of fuel in the fuel tanks between the plurality of fuel cell engines;

adjust a required load output, which is an electrical power consumption amount of each of the loads, so as to reduce the difference;

acquire a required electrical power of the traction motor; and adjust the required load output, in a case that the vehicle speed is greater than or equal to a set value, and the required electrical power of the traction motor is greater than or equal to a threshold value.

\* \* \* \* \*